US012793684B2

(12) United States Patent
Li et al.

(10) Patent No.: US 12,793,684 B2
(45) Date of Patent: Nov. 10, 2026

(54) BROADBAND NOISE AND VIBRATION CANCELING META-BARRIERS FOR 2D THIN WALL STRUCTURES

(71) Applicant: Toyota Motor Engineering & Manufacturing North America, Inc., Plano, TX (US)

(72) Inventors: Xiaopeng Li, Ann Arbor, MI (US); Taehwa Lee, Ann Arbor, MI (US)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 187 days.

(21) Appl. No.: 18/612,396

(22) Filed: Mar. 21, 2024

(65) Prior Publication Data

US 2025/0299660 A1 Sep. 25, 2025

(51) Int. Cl.
*G10K 11/162* (2006.01)

(52) U.S. Cl.
CPC .................................. *G10K 11/162* (2013.01)

(58) Field of Classification Search
CPC .................................................... G10K 11/162
USPC .......................................................... 181/207
See application file for complete search history.

(56) References Cited

U.S. PATENT DOCUMENTS 10,808,794 B1 * 10/2020 Boyce ..................... F16F 15/02
2006/0169531 A1 8/2006 Volker
2008/0223653 A1 9/2008 Kim et al.
2009/0255755 A1 10/2009 Matsuyama et al.
2015/0136521 A1 5/2015 Swinkels et al.
2022/0051650 A1 * 2/2022 Lee ...................... G10K 11/172
2022/0148555 A1 5/2022 Su et al.
2022/0285604 A1 9/2022 Li et al.
2023/0349151 A1 * 11/2023 Lee ...................... G10K 11/172
2024/0372530 A1 * 11/2024 Li ...................... H03H 9/02015

FOREIGN PATENT DOCUMENTS

CN 114925594 A * 8/2022 ............. G06F 30/23
JP 2006207749 A 8/2006
JP 4392700 B2 1/2010
JP 2016109283 A 6/2016

OTHER PUBLICATIONS

Machine translation of Yang CN114925594 (Year: 2022).*
(Continued)

*Primary Examiner* — Forrest M Phillips
(74) *Attorney, Agent, or Firm* — Christopher G. Darrow; Darrow Mustafa PC

(57) ABSTRACT

A vibration and noise absorber includes a thin wall structure with an arbitrary boundary condition and at least one meta-element attached to an edge of the thin wall structure. The at least one meta-element has a topology optimized shape that is a function of an objective function that minimizes a reflection coefficient of flexural waves in the audible frequency range propagating towards and impinging the at least one meta-element. In some variations, the vibration and noise absorber is a plurality of meta-elements attached to an edge of a thin wall panel such that a meta-barrier that absorbs over 99.5 percent of flexural waves in the audible frequency range is provided.

20 Claims, 16 Drawing Sheets

(56) References Cited

OTHER PUBLICATIONS

International Search Report and Written Opinion, PCT Application No. PCT/US2024/029935, "Broadband Noise and Vibration Canceling Meta-Barriers for 2D Thin Wall Structures," mailed on Dec. 11, 2024, 9 pages.

Chen et al., "Enhanced flexural wave sensing by adaptive gradient-index metamaterials," Scientific reports 6 (2016): 35048, pp. 1-12, https://cyberleninka.org/article/n/1444481.pdf.

Julien Leng, "Controlling flexural waves using subwavelength perfect absorbers: application to Acoustic Black Holes," PhD diss., Université du Maine, 2019, 143 pages, https://theses.hal.science/tel-02443214/file/2019LEMA1027.pdf.

Viana et al., "Multimodal vibration damping through piezoelectric patches and optimal resonant shunting circuits," Journal of the Brazilian Society of Mechanical Sciences and Engineering 28, No. 3 (2006), pp. 293-310.

* cited by examiner

FIG. 10C
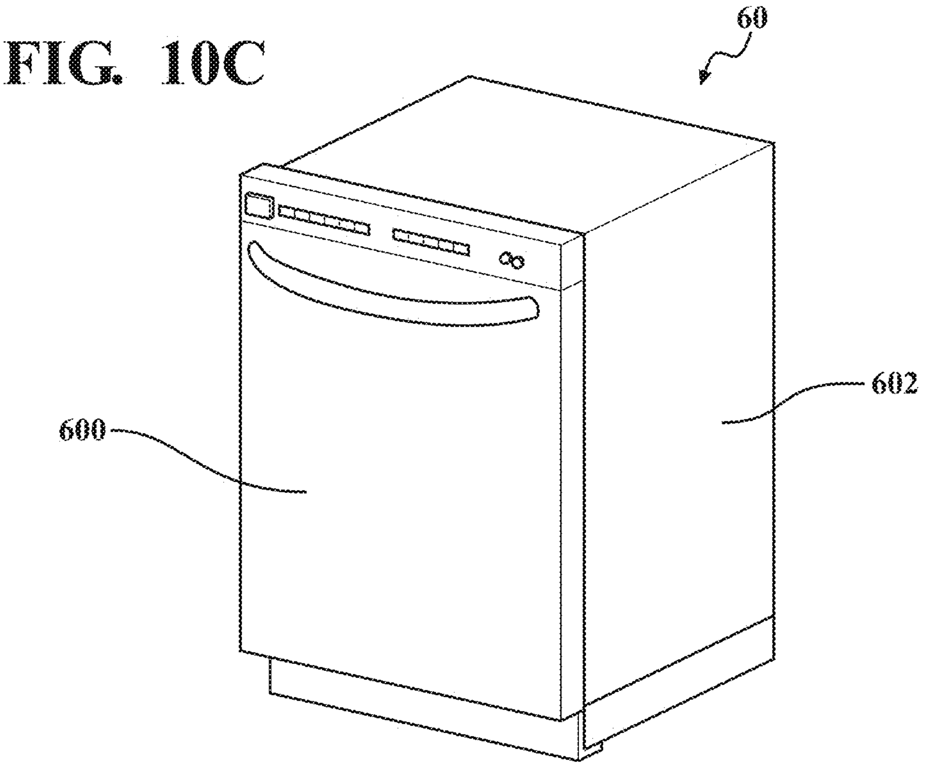
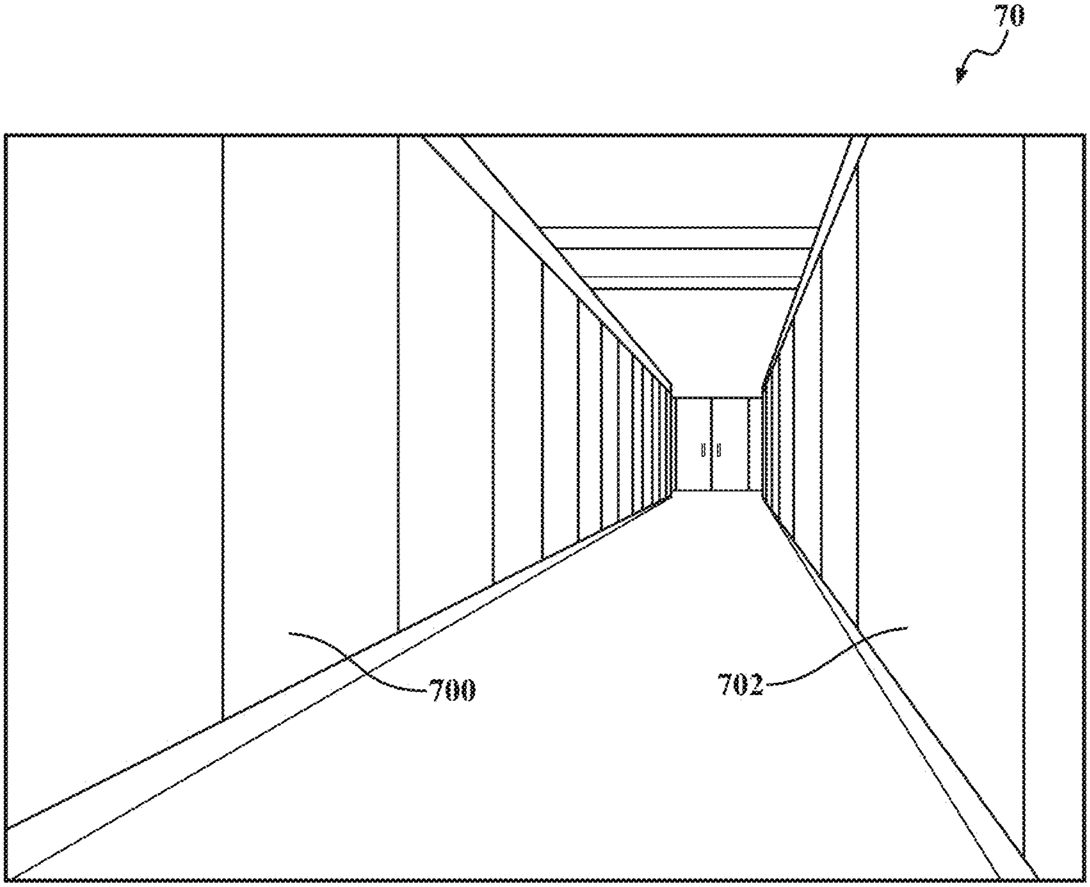
FIG. 10D

BROADBAND NOISE AND VIBRATION CANCELING META-BARRIERS FOR 2D THIN WALL STRUCTURES

TECHNICAL FIELD

The present disclosure relates to noise and vibration absorbers and particularly to noise and vibration absorbers for thin wall structures at broadband widths.

BACKGROUND

Structural-born noise and vibrations acting upon a structure are generally viewed as problematic. Traditional methodologies for attenuating structural born noise and vibrations typically involve the use of a dampening material that is bonded to the structure itself. However, dampening materials generally occupy a large surface area of such structures and usually result in an undesirable increase in weight, and are not able to effectively attenuate structural vibrations at the structure's resonance frequency.

SUMMARY

This section generally summarizes the disclosure and is not a comprehensive explanation of its full scope or all its features.

In one form of the present disclosure, a vibration and noise absorber includes a thin wall structure with an arbitrary boundary condition and at least one meta-element attached to an edge of the thin wall structure, the at least one meta-element has a topology optimized shape that is a function of an objective function that minimizes a reflection coefficient of flexural waves in the audible frequency range propagating towards and impinging the at least one meta-element.

In another form of the present disclosure, a vibration and noise absorber includes a thin wall structure with at least one edge with an arbitrary boundary condition and a meta-barrier attached to the at least one edge. The meta-barrier includes comprising a plurality of meta-elements and has a topology optimized shape that is a function of an objective function that minimizes a reflection coefficient of flexural waves in the audible frequency range propagating towards and impinging the meta-barrier.

In still another form of the present disclosure, a vibration and noise absorber includes a thin wall 2D panel with at least one edge that has an arbitrary boundary condition and a meta-barrier attached to the at least one edge. The meta-barrier has a topology optimized shape that is a function of an objective function that minimizes a reflection coefficient of flexural waves in the audible frequency range propagating towards and impinging the meta-barrier. The meta-barrier has an average absorption coefficient greater than 99.9% for flexural waves in the audible frequency range propagating along the 2D panel and impinging the meta-barrier.

Further areas of applicability and various methods of enhancing the disclosed technology will become apparent from the description provided. The description and specific examples in this summary are intended for illustration only. They are not intended to limit the scope of the present disclosure.

BRIEF DESCRIPTION OF THE DRAWINGS

The accompanying drawings, which are incorporated in and constitute a part of the specification, illustrate various systems, methods, and other forms or variations of the disclosure. It will be appreciated that the illustrated element boundaries (e.g., boxes, groups of boxes, or other shapes) in the figures represent one form or variation of the boundaries. In some forms or variations, one element may be designed as multiple elements or multiple elements may be designed as one element. In some forms and variations, an element shown as an internal component of another element may be implemented as an external component and vice versa. Furthermore, elements may not be drawn to scale.

FIG. 10C illustrates an appliance with 2D thin wall structures with meta-barriers according to the teachings of the present disclosure;

FIG. 10D illustrates a work environment with 2D thin wall structures with meta-barriers according to the teachings of the present disclosure.

DETAILED DESCRIPTION

Figure 1A:
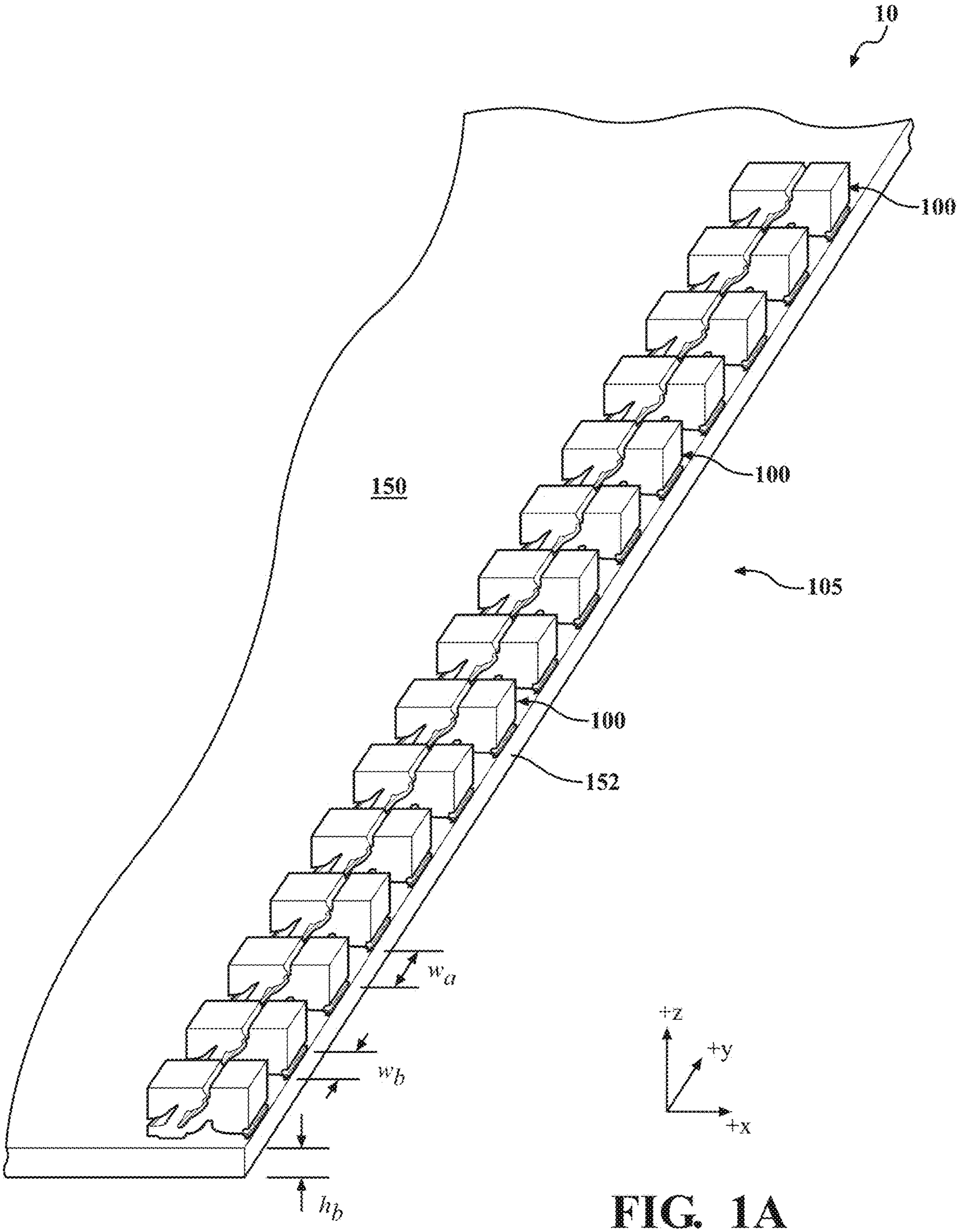
FIG. 1A illustrates a broadband flexural wave absorbing meta-barrier according to the teachings of the present disclosure.

The present disclosure provides vibration and noise absorbing structures (also referred to herein simply as "absorbers") for thin wall structures. The absorbers are topological optimization designed absorbers with flexural sub-wavelength scale dimensions. The absorbers are thus also referred to herein as "meta-element", "meta-elements", "meta-surface", "meta-barrier" and/or "meta-barriers". The topological optimized meta-element(s) and topological optimized meta-barrier(s) generally exhibit near total absorption (e.g., >99.5%) of broadband flexural waves propagating along thin wall structures to which the topological optimized meta-element(s) and/or topological optimized meta-barrier(s) are attached. In some variations, the topological optimized meta-element(s) and/or topological optimized meta-barrier(s) according to the teachings of the present disclosure absorb more than 99.9% of flexural waves within the audible range of frequencies (audible frequency range).

As used herein, the phrase "topological optimization", also known as "topology optimization", refers to a method for optimizing material distribution within a given design domain (space) as a function of one or more predefined boundary conditions such that a property or function of a component manufactured or fabricated with the optimized material distribution is enhanced and/or maximized. As used herein, the term "broadband" refers to a range of flexural wave frequencies greater than about 700 hertz (Hz), e.g., a range flexural wave frequencies greater than about 1000 Hz, a range of flexural wave frequencies greater than about 1500 Hz, and/or a range of flexural wave frequencies greater than about 2000 Hz. And as used herein, the phrase "audible frequency range" refers to frequencies between about 20 Hz and about 20 kHz.

The topological optimized meta-elements and/or topological optimized meta-barriers according to the teachings of the present disclosure can be used or attached to one-dimensional (1D) thin wall structures and/or two-dimensional (2D) thin wall structures. As used herein, the term "one-dimensional" or "1D" refers to a structure that extends primarily in one direction (e.g., a beam) and the phrase "thin wall structures" refers to structures having a thickness that is less than or equal to 1/10 of a wavelength of flexural waves that propagate along the structure and for which an absorber is designed to absorb. And as used herein, the term "two-dimensional" or "2D" refers to a structure that has a length and width that are both at least 100 times greater than the thickness of the structure (e.g., a plate, sheet, or panel).

In some variations, the topological optimized meta-elements and/or topological optimized meta-barriers are attached at or near an edge of a thin wall structure and the edge has an arbitrary boundary condition. As used herein, the phrase "arbitrary boundary condition" refers to an edge that can freely vibrate (without mechanical restriction) in all directions, an edge that can be supported such that the edge can freely vibrate in a limited number of directions (e.g., either above or below a mechanical support), or an edge that is fixed (e.g., clamped) such that the edge cannot freely vibrate in any direction. Stated differently, the boundary condition of the edge can be, for example, free, supported, or fixed, among others, and thus is arbitrary.

Referring to FIG. 1A, one example of a broadband flexural wave-absorbing meta-barrier 10 (also referred to herein as "topological optimized meta-barrier" or simply "meta-barrier") for a 2D thin wall structure 150 is shown. The meta-barrier 10 includes a plurality of topological optimized meta-elements 100 (also referred to herein simply as "meta-elements 100") bonded at or near an edge 152 of the 2D thin wall structure 150. The 2D thin wall structure 150 has a thickness 'hb'. In some variations, the plurality of meta-elements 100 form an array of meta-elements 105 (also referred to herein as a "meta-barrier 105") with a spacing '$w_a$' between each meta-element 100 and the meta-barrier 10 covers or occupies less than 90% of a major surface 154 of the 2D thin wall structure 150. And in at least one variation, the meta-barrier covers or occupies less than 95% of a major surface 154 of the 2D thin wall structure 150. As used herein, the phrase "major surface" refers to a surface of a 2D thin wall structure having a surface area at least 100 times greater than a surface area of an edge of the 2D thin wall structure. Stated differently, a major surface of a 2D thin wall structure is not a surface of an edge of the 2D thin wall structure.

As used herein, the phrase "at an edge" or "at the edge" refers to a meta-element and/or meta-barrier according to the teachings of the present disclosure that extends at least to an edge of a 2D thin wall structure to which it is attached. And the phrase "near an edge" or "near the edge" as used herein refers to a meta-element and/or meta-barrier according to the teachings of the present disclosure having a terminal surface that is positioned at a location spaced apart from an edge of a 2D thin wall structure to which it is attached at a distance less than or equal to one wavelength of the lowest flexural wave frequency of interest (i.e., desired to be absorbed).

Figure 1B:
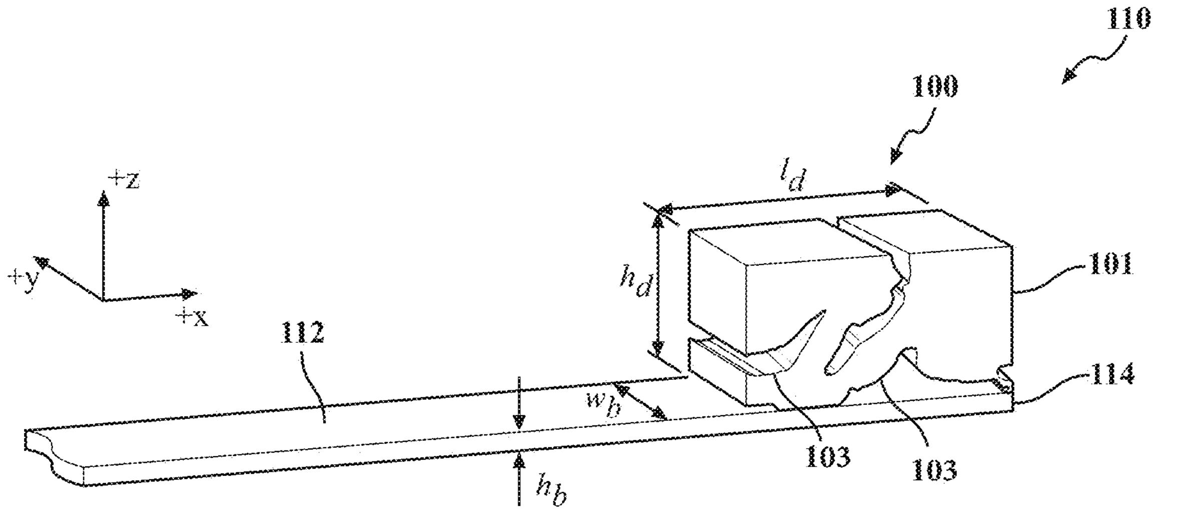
FIG. 1B illustrates a unit cell of the broadband flexural wave absorbing meta-barrier in FIG. 1A with a host structure in the form of a semi-infinite beam and a meta-element attached at or near an end of the semi-infinite beam.

Referring to FIG. 1B, a unit cell 110 of the meta-barrier 10 is shown. The unit cell 110 includes a host structure 112 (e.g., a semi-infinite beam) and a meta-element 100 with a terminal surface 101. In some variations, the meta-element includes one or more irregular surfaces 103, for example, one or more internal irregular surfaces 103. As used herein, the phrase "irregular surface" refers to a surface with a shape derived or obtained via topological optimization and having two or more (e.g., three, four, five, six, etc.) non-equal radii along the surface length (x-direction in the figures). And as used herein, the phrase "internal irregular surface" refers to an irregular surface extending within an interior of a meta-element as illustrated by the irregular surfaces 103 in FIG. 1B.

The meta-element 100 is bonded at or near a boundary 114 (e.g., the edge 152) of the host structure 112, and has a width '$w_b$', a length '$l_d$' and a height '$h_d$'. The host structure 112 also has the width $w_b$. As used herein, the phrase "terminal surface" refers to a surface of a design domain, meta-element, and/or meta-barrier that is distal from a source of vibration of a thin wall structure to which the design domain, meta-element, and/or meta-barrier is attached to compared to other surfaces of the design domain, meta-element, and/or meta-barrier. In some variations, the terminal surface is the most distal surface of the design domain, meta-element, and/or meta-barrier, i.e., the terminal surface is distal from a source of vibration of a thin wall structure to which the design domain, meta-element, and/or metal-barrier is attached to compared to all other surfaces of the design domain, meta-element, and/or metal-barrier. And in some variations, and as noted above, the terminal surface of a design domain, meta-element, and/or metal-barrier extends beyond a terminal end of a 1D thin wall structure or an edge of a 2D thin wall structure.

Figure 1C:
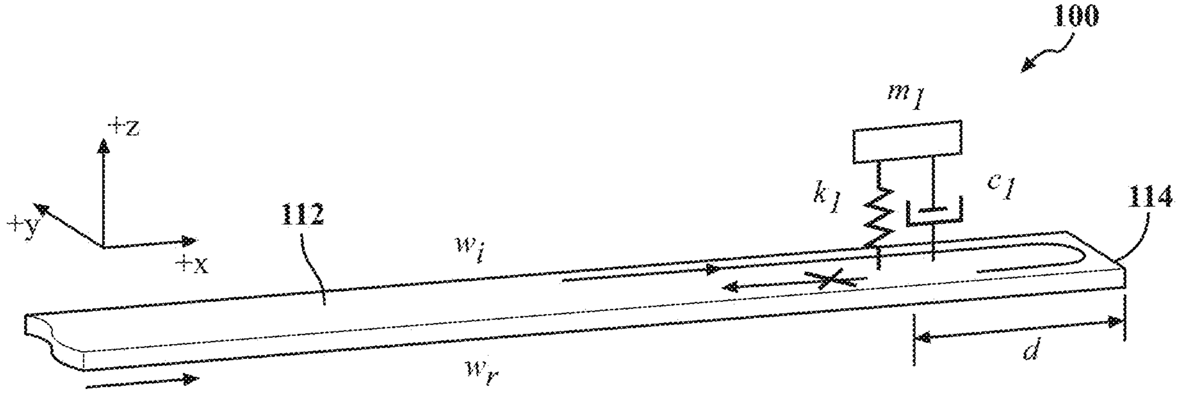
FIG. 1C illustrates a theoretical model of the unit cell in FIG. 1B.
Figure 1D:
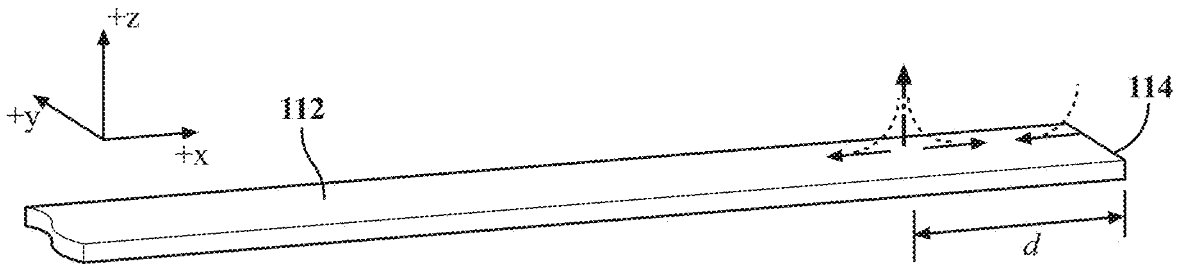
FIG. 1D illustrates a point force excitation at a distance 'd' from an end of the semi-infinite beam in FIG. 1C.

Referring to FIG. 1C, a design of the meta-element 100 assumes a single damped resonator located at a distance 'd' from the boundary 114 of a semi-infinite slender beam, and for a general case, a point force F, due to an attached scatterer, is applied at x=X, which is located at L d away from the boundary 114 (terminal end) of the host structure 112 (FIG. 1D).

Not being bound by theory, the governing equation of the host structure 112, according to Euler's beam assumptions, can be written as:

$$D\frac{\partial^4 \omega(x,t)}{\partial x^4} - \rho A \cdot \frac{\partial^2 \omega(x,t)}{\partial t^2} = F(t)\delta(x-X) \quad \text{Eqn. 1}$$

where ω, D, ρ and A are the displacement in the vertical direction (z-direction), bending stiffness, mass density, and cross-section area (y-z plane) of the host structure 112, respectively.

Assuming the location of the point force is at X=0, a point force attachment impedance is defined as μ=F/ω, and a time harmonic motion (i.e., $\omega = We^{iwt}$) with the time harmonic time can be dropped from Eqn. 1, the governing equation of the host structure 112 can be written as:

$$D\left(\frac{d^4 W(x)}{dx^4} - k^4 W(x)\right) = \mu W(X)\delta(x-X) \quad \text{Eqn. 2}$$

where W is the displacement of the host structure 112, k is the flexural wavenumber defined as $k^4=\omega^2\rho A/D$ and ω is the angular frequency.

The total wave field is the summation of the incident waves $W_i$, the reflected waves $W_{ir}$ and $W_{irn}$ due to the terminal end of the beam, and assuming the scattered waves at the point force impedance, and is given as:

$$W(x) = W_i(x) + W_{ir}(x) + W_{irn}(x) + g(x-X)m_X^{-1}W(X) \quad \text{Eqn. 3}$$

where $W_{ir}=R_iW_i$, $W_{irn}=R_nW_i$, and $R_i$ and $R_n$ are reflection coefficients from the terminal end (boundary) 114 for propagating and non-propagating waves, respectively, and $m_X$ is the normalized force impedance expressed as:

$$m_X = 2Dk^3/\mu \quad \text{Eqn. 4}$$

The reflection coefficients $R_i$ and $R_n$ for a free end boundary condition (FBC), a clamped end boundary condition (CBC), and a simply-supported end boundary condition (SBC) are summarized in Table 1 below.

TABLE 1

| Boundary Condition | $R_i$ | $R_n$ |
|---|---|---|
| FBC | $-ie^{-2ikL}$ | $(1-i)e^{-kL}e^{-ikL}$ |
| CBC | $-ie^{-2ikL}$ | $-(1-i)e^{-kL}e^{-ikL}$ |
| SBC | $-ie^{-2ikL}$ | 0 |

Given the boundary conditions above for a free end boundary condition, the non-dimensional Green's function g(x) is given as $$g(X) = 2Dk^3G(x) = \begin{cases} A_1e^{kx} + A_2e^{-kx} + A_3e^{ikx} + A_4e^{-ikx}, & x \in [-L, 0] \\ B_2e^{-kx} + B_4e^{-ikx}, & x \in [0, +\infty] \end{cases} \quad \text{Eqn. 5}$$

where the coefficients for a specific case, i.e., FBC, CBC, and SBC are listed in Table 2 below. It should be understood that the free end boundary condition refers to a terminal end or edge of a thin wall structure that is free to vibrate in the +/−z directions illustrated in the figures (i.e., up and down), the clamped end boundary condition refers to a terminal end or edge of a thin wall structure that is restricted from vibrating in the +/−z directions illustrated in the figures, and the simply-supported boundary condition refers to a terminal end or edge of a thin wall structure that is supported on one side and thus can only move or vibrate on the + side of the z-axis (i.e., only above the x-y plane) or the − side of the z-axis (i.e., only below the x-y axis) illustrated in the figures. It should also be understood that the boundary conditions are determined by satisfying the continuity and equilibrium conditions at the point force interface and two additional moment and shear free conditions at the free end of the beam at x=L. Similarly, the coefficients in the Green's function for other boundary conditions, i.e., clamped boundary condition and simply-supported boundary condition, can be obtained by satisfying the corresponding boundary conditions given in Table 2 below.

TABLE 2

| Boundary Condition - FBC | |
|---|---|
| $A_1$ | $-i/2$ |
| $A_2$ | $-e^{-kL}(e^{-kL} + (1 - i)e^{-kL}e^{-ikL})/2$ |
| $A_3$ | $-i/2$ |
| $A_4$ | $-e^{-kL}((1 + i)\ e^{-kL} + e^{-ikL})/2$ |
| $B_2$ | $-e^{-kL}(e^{-kL} - e^{-ikL} + (1 - i)e^{-ikL})/2$ |
| $B_4$ | $-e^{-ikL}((1 + i)\ e^{-kL} + ie^{ikL} + e^{-ikL})/2$ |
| **Boundary Condition - CBC** | |
| $A_1$ | $-1/2$ |
| $A_2$ | $-e^{-kL}(e^{-kL} + (1 - i)e^{-kL}\ e^{-ikL})/2$ |
| $A_3$ | $-i/2$ |
| $A_4$ | $e^{-kL}((1 + i)\ e^{-kL} + e^{-ikL})/2$ |
| $B_2$ | $-(1 + ie^{-2kL} - (1 + i)e^{-(1+i)kL})/2$ |
| $B_4$ | $((1 + i)e^{-(1+i)kL} - e^{-2kL} - i)/2$ |
| **Boundary Condition - SBC** | |
| $A_1$ | $-1/2$ |
| $A_2$ | $e^{-2kL}/2$ |
| $A_3$ | $-i/2$ |
| $A_4$ | $ie^{-2kL}/2$ |
| $B_2$ | $(e^{-2kL} - 1)/2$ |
| $B_4$ | $i(e^{-2kL} - 1)/2$ |

Solving for the displacement at x=X=0 in Eqn. 3 by setting x=0 gives:

$$W(0) = \frac{(1 + R_i + R_n)W_i(0)m_X}{m_X - g(0)} \quad \text{Eqn. 6}$$

and substitution of Eqn. 6 into Eqn. 3 gives:

$$W(x) = W_i + W_{ir} + W_{irn} + g(x - X)\cdot\frac{(1 + R_i + R_n)W_i(0)}{m_X - g(0)}. \quad \text{Eqn. 7}$$

And assuming the incidence waves propagate from the right to the left can be expressed as:

$$W_i = e^{ikx}, \quad \text{Eqn. 8}$$

allows for the total wave field with the reflection coefficient R to be defined as:

$$W(x) = W_i + \mathrm{R}e^{-ikx},\ x \to +\infty, \quad \text{Eqn. 9}$$

Also, comparing Eqns. 7 and 9 allows for the reflection coefficient R to be expressed as:

$$R = R_i + B_4\cdot\frac{(1 + R_i + R_n)}{m_X - g(0)}, \quad \text{Eqn. 10}$$

and the absorption coefficient follows as:

$$\alpha = 1 - |R|^2. \quad \text{Eqn. 11}$$

To achieve perfect absorption (or zero reflection, i.e., R=0), the required normalized force impedance from Eqn. 9 is:

$$m_X = g(0) - B_4\cdot\frac{(1 + R_i + R_n)}{R_i}, \quad \text{Eqn. 12}$$

and using Eqn. 5 in Eqn. 12 results in:

$$m_X = B_2 - \frac{B_4}{R_i}\cdot(1 + R_n) \quad \text{Eqn. 13}$$

Accordingly, the attached point force impedance should satisfy this requirement (i.e., Eqn. 13) to achieve perfect absorption and thus a broadband perfect absorber can be designed according to this impedance. And while Eqn. 13 provides a condition for force impedance, it should be understood that other impedances, e.g., mass impedance, can be derived and used for designing a meta-element and/or meta-barrier according to the teachings of the present disclosure.

To complete the design of a broadband perfect flexural wave absorber that meets the requirement of the attached point force impedance per Eqn. 13, or any other impedance, topological optimization is used for determining a final shape and volume thereof. For example, the Solid Isotropic Material with Penalization (SIMP) method can be used where the design domain of the meta-element 100 is meshed to finite elements and for which the density of the materials forming the meta-element 100 are appointed based on the design variables. Accordingly, material densities are used as a design variable and a density range from 0 (void region) to 1 (solid region) can be used. Also, a penalty method can be used to eliminate intermediate densities (i.e., densities not equal to 0 or 1) by appointing or assigning the discrete value of 0 or 1.

For the topological optimization of the design domain for the meta-elements 100 shown in FIG. 1A, the design domain had a length $l_d$ equal to 40 millimeters (mm), a height $h_d$ equal to 20 mm and a width $w_b$ equal to 12.7 mm, which was also equal to the width $w_b$ of the host structure 112. An objective function of minimizing the reflection coefficient ($R^2$), as described by Eqn. 10, of incident waves within a predefined frequency range of 700-1500 Hz was used. Also, a Helmholtz-type filter and Hyperbolic tangent projection were employed to avoid numerical instabilities during the optimization routine and the optimization process terminated either when the change of the objective function and design variables were below predefined values or the maximum allowable number of iterations was reached.

Figure 2A:
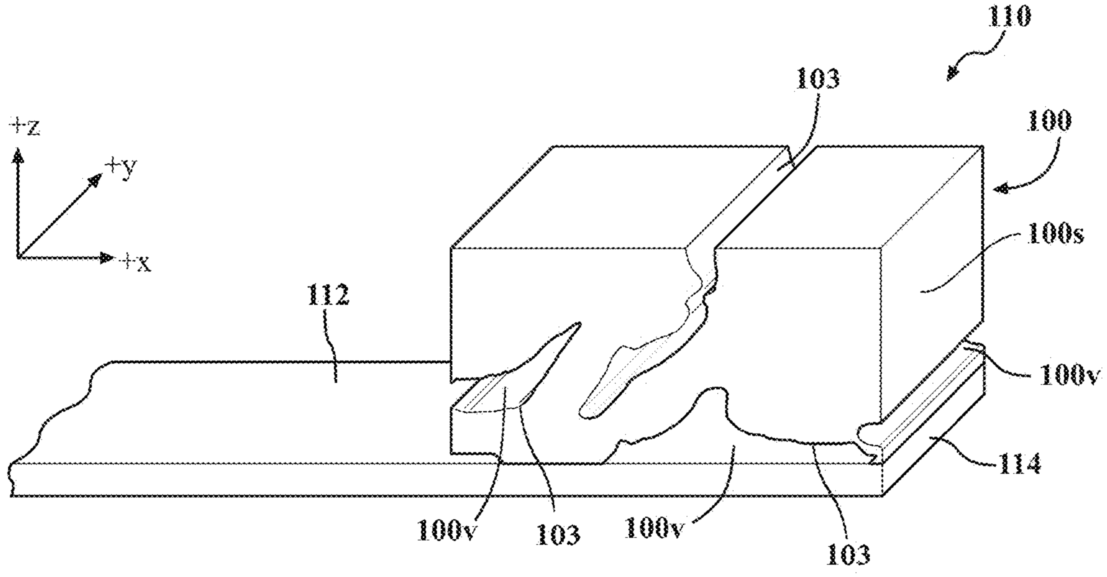
FIG. 2A illustrates the unit cell in FIG. 1B with a meta-element according to the teachings of the present disclosure.

Referring to FIG. 2A, a unit cell 110 with a host structure 112 and a meta-element 100 designed via topological optimization is shown. And as observed in FIG. 2A, the meta-element 100 includes a solid portion 100*s* and one or more irregular surfaces 103 that define one or more void portions 100*v*. The distribution of the solid and void portions 100*s*, 100*v* was determined via the optimization function expressed by:

$$\min\{\text{sum}_l^N(|R_l|^2)\}, \qquad \text{Eqn. 14}$$

where $R_l = w_r/w_i$, with $w_i$ being an incident amplitude and $w_r$ being a reflected displacement amplitude of the vibration, and l=1, 2, . . . N is a frequency index. The frequency index is essentially a range of frequencies that the meta-element 100 should be able to absorb. As such, the topological optimization problem utilizes several inputs, including the design domain for the meta-element 100, the incident amplitude, reflected displacement amplitude, and/or the frequency index. In addition, other inputs may also be utilized, such as material properties of the material that will form the meta-element 100, physical characteristics of the unit cell 110, such as the host structure 112, etc. For example, the meta-element 100 was fabricated from polyethylene terephthalate (PETG) and the host structure 112 was made from an aluminum alloy. However, it should be understood that the meta-element 100 can be made out of any suitable material, such as other polymers, metals and their alloys, ceramics, metal composites, polymer composites, and rubber, among others.

Figure 2B:
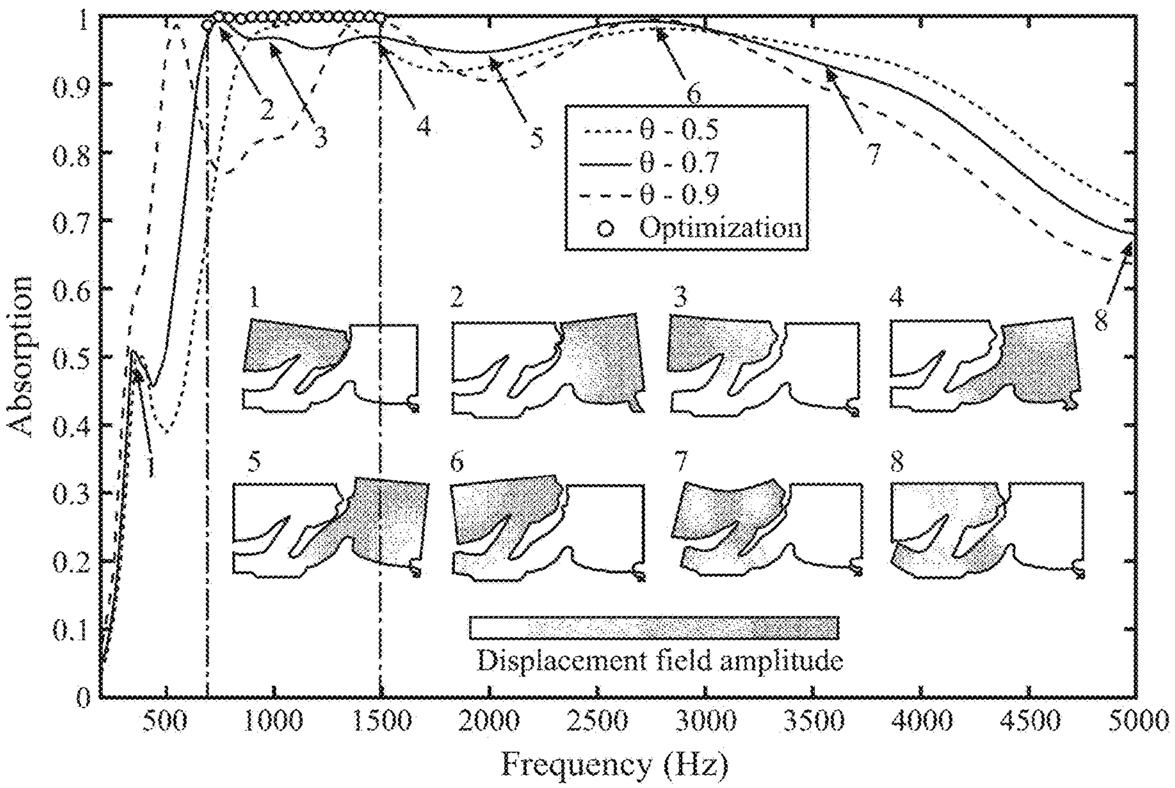
FIG. 2B is a graphical plot of numerical simulation results of absorption as a function of flexural wave frequency for the unit cell in FIG. 2A.

Referring to FIG. 2B, a plot of numerically simulated absorption versus flexural wave frequency is shown for the unit cell 110 in FIG. 2A with a filter threshold parameter 'θ' equal to 0.5, 0.7, and 0.9. In addition, the circular markers (dots) represent the absorption coefficients of the meta-element 100 at the end of the topological optimization process. As observed from FIG. 2B, the absorption spectrum is more sensitive to the filter threshold parameter in the lower-frequency range, from about 500 Hz to 1500 Hz, and is less sensitive for frequencies greater than 1500 Hz. FIG. 2B also illustrates an eigen analysis for the unit cell 110 with the arrows labeled 1-8 denoting the calculated eigenfrequencies and the corresponding eigenmodes shown in the inner panel of FIG. 2B. It should be understood that resonant modes are well distributed over the broad frequency range and very high absorption is achieved.

Figure 2C:
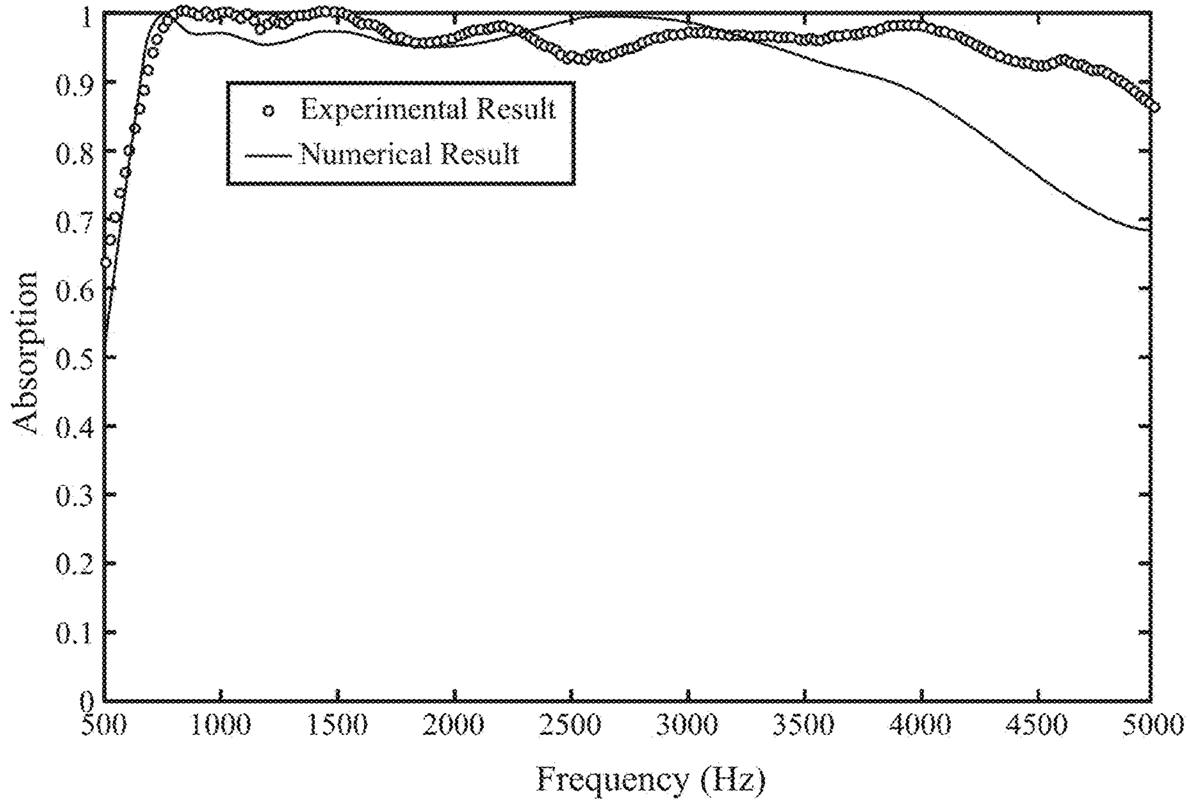
FIG. 2C is a graphical plot of numerical simulation results and experimental results of absorption as a function of flexural wave frequency for the unit cell in FIG. 2A.

Referring to FIG. 2C, a comparison of the numerically simulated absorption and experimentally measured absorption as a function of flexural wave frequency for the meta-element 100 is shown. A maximum absorption of more than 95% by the meta-element 100 was experimentally measured and absorption of more than 90% was experimentally observed over a broad frequency range from 700 Hz to over 4000 Hz. In addition, the experimentally measured results show good agreement with the numerically simulated results with discrepancies due to fabrication deviation and imperfect bonding of the meta-element 100 to the host structure 112.

Figure 3A:
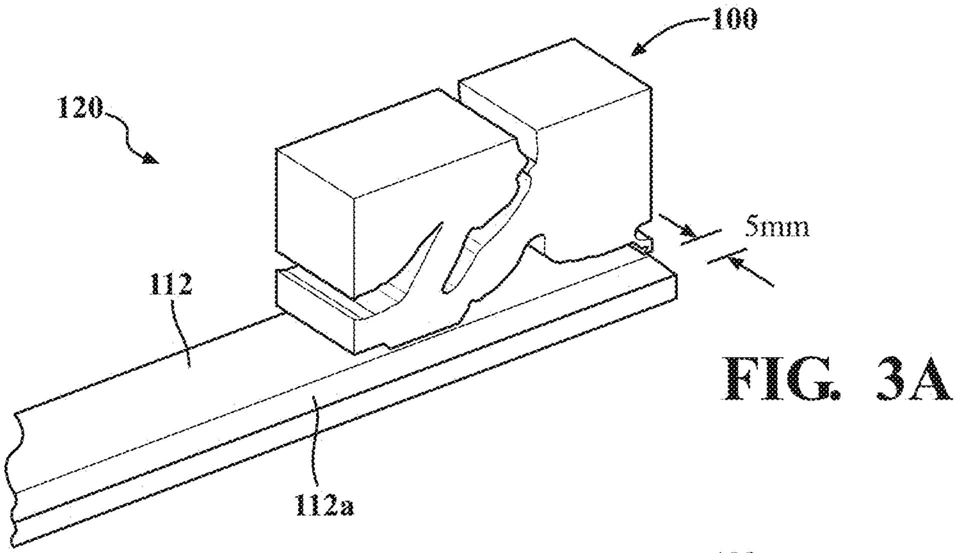
FIG. 3A illustrates one variation of a super-cell for a meta-barrier according to the teachings of the present disclosure that includes the meta-element in FIG. 2A.
Figure 3B:
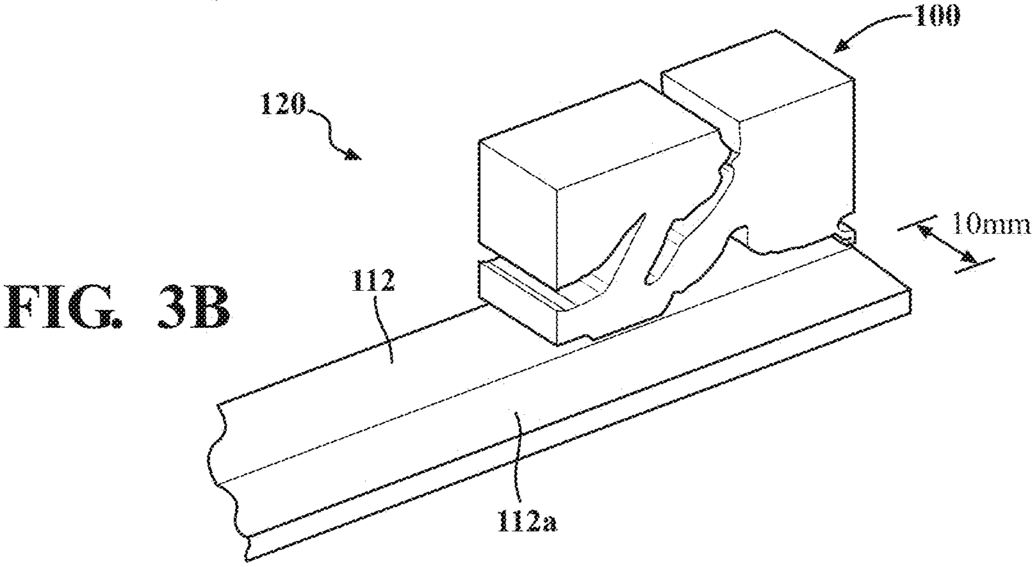
FIG. 3B illustrates another variation of a super-cell for a meta-barrier according to the teachings of the present disclosure that includes the meta-element in FIG. 2A.
Figure 3C:
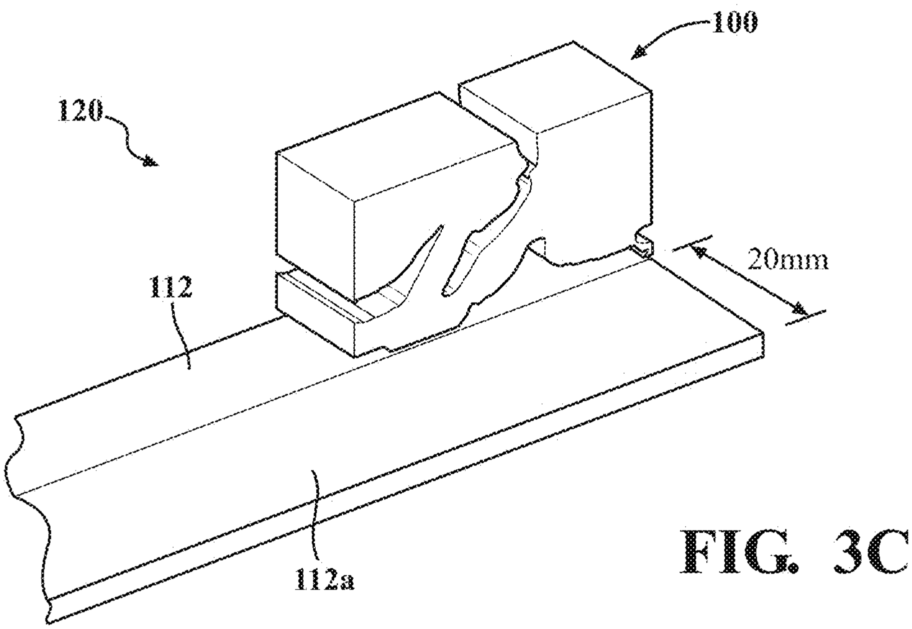
FIG. 3C illustrates still another variation of a super-cell for a meta-barrier according to the teachings of the present disclosure that includes the meta-element in FIG. 2A.

In some variations the design of a unit cell for a 1D thin wall structure is expanded or further developed into a meta-barrier for a 2D thin wall structure. For example, and with reference to FIGS. 3A-3C, three non-limiting examples (variations) of super-cells 120 used for the design of a meta-barrier 105 (e.g., see FIG. 1A) are shown. The super-cells 120 include the initial host structure 112 and the meta-element 100, plus a predefined width (y-direction) of additional host material 112*a*. That is, the super-cells 120 include the unit cells 110 with meta-elements 100 described above, plus an additional width of host structure 112. For example, FIG. 3A illustrates a super-cell 120 with 5 mm of additional host material 112*a*, FIG. 3B illustrates a super-cell 120 with 10 mm of additional host material 112*a*, and FIG. 3C illustrates a super-cell 120 with 20 mm of additional host material 112*a*. Also, it should be understood that the width of the additional host material 112*a* can be the spacing distance $w_a$ between meta-elements 100 (FIG. 1A) and repeating super-cells 120 form a meta-barrier configured to be or actually attached at or near an edge of a 2D thin wall structure.

Figure 4A:
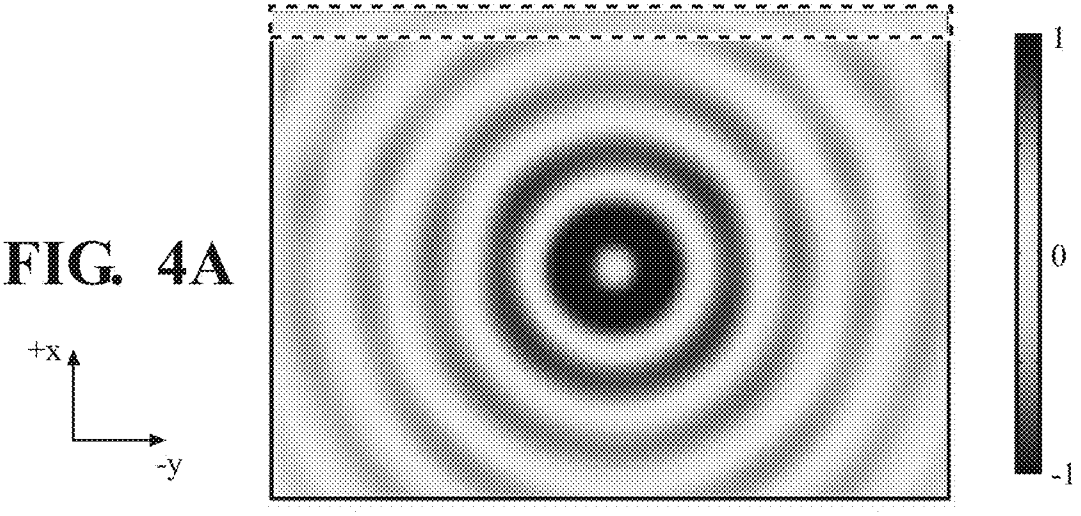
FIG. 4A illustrates a wave field excited by a point source, at a first frequency equal to 1000 Hz, at the center of a 2D thin wall structure with a meta-barrier having a plurality of super-cells shown in FIG. 3A attached to an edge of the 2D thin wall structure.
Figure 4B:
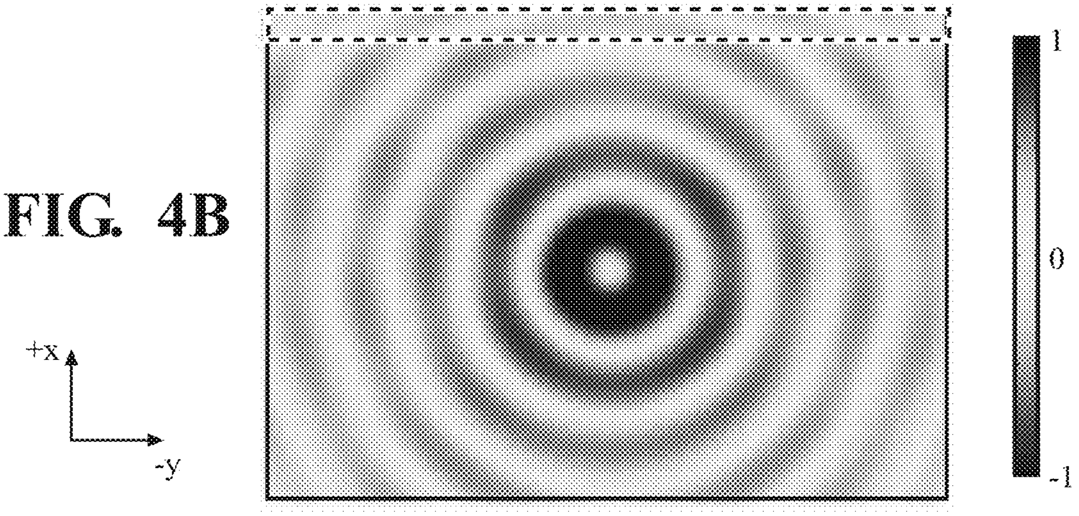
FIG. 4B illustrates a wave field excited by a point source, at the first frequency, at the center of a 2D thin wall structure with a meta-barrier having a plurality of super-cells shown in FIG. 3B attached to an edge of the 2D thin wall structure.
Figure 4C:
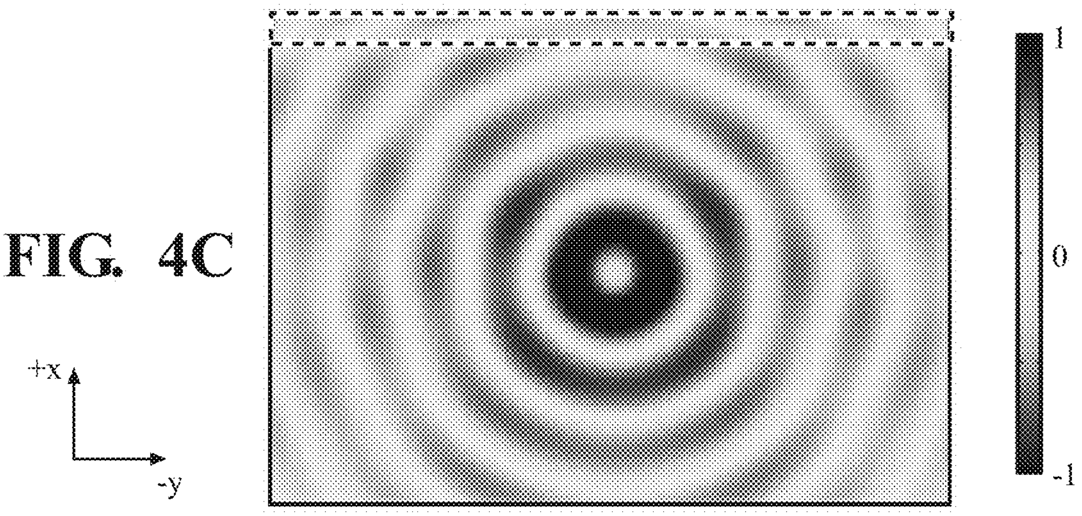
FIG. 4C illustrates a wave field excited by a point source, at the first frequency, at the center of a 2D thin wall structure with a meta-barrier having a plurality of super-cells shown in FIG. 3C attached to an edge of the 2D thin wall structure.
Figure 5A:
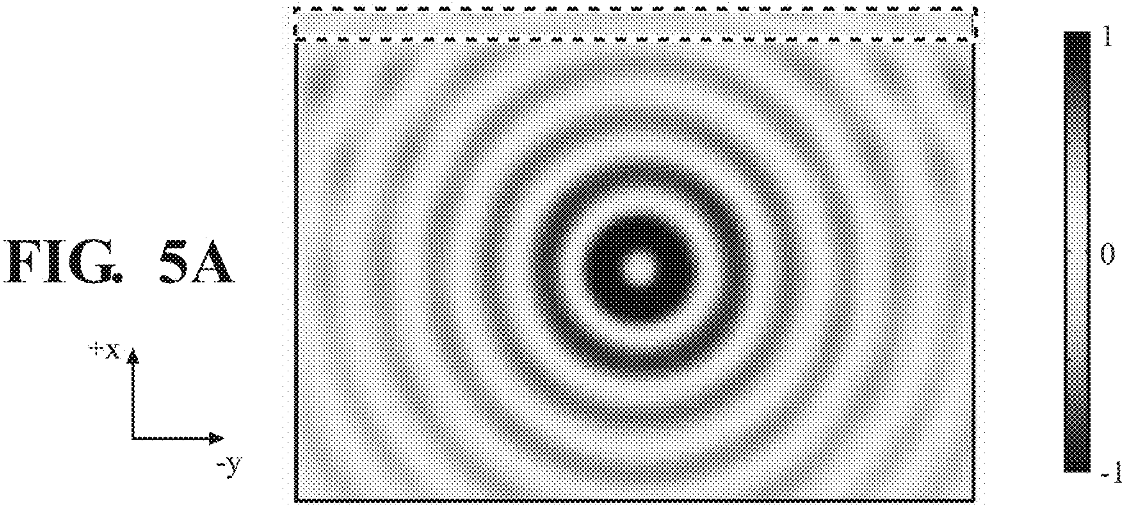
FIG. 5A illustrates the wave field excited by a point source, at a second frequency equal to 1500 Hz, at the center of a 2D thin wall structure with a meta-barrier having a plurality of super-cells shown in FIG. 3A attached to an edge of the 2D thin wall structure.
Figure 5B:
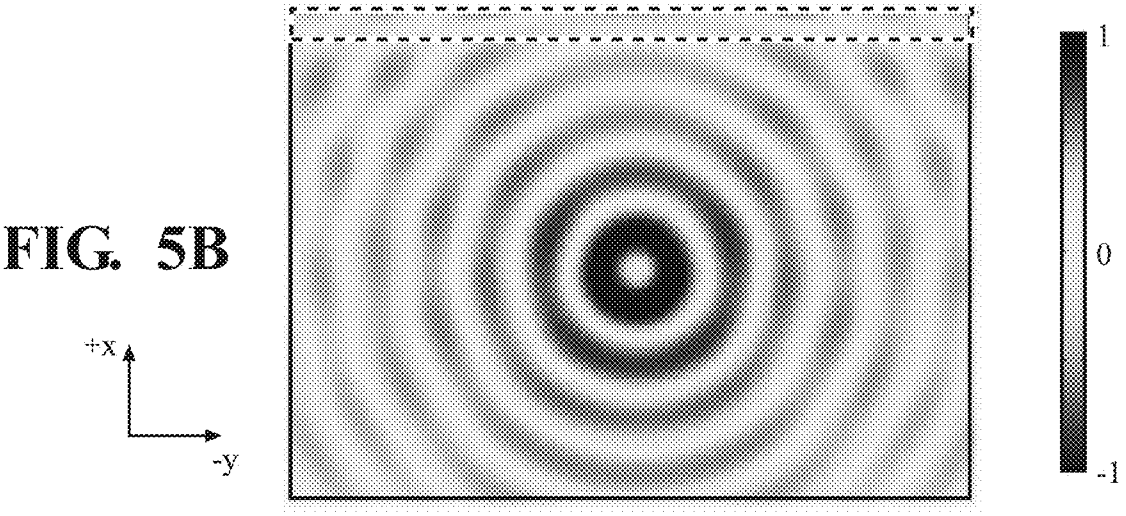
FIG. 5B illustrates the wave field excited by a point source, at the second frequency, at the center of a 2D thin wall structure with a meta-barrier having a plurality of super-cells shown in FIG. 3B attached to an edge of the 2D thin wall structure.
Figure 5C:
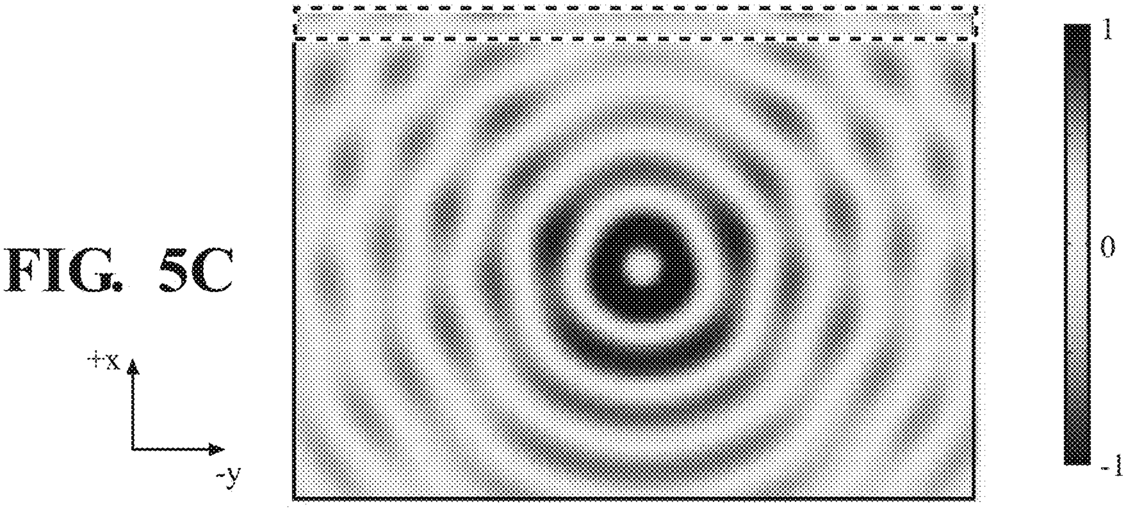
FIG. 5C illustrates the wave field excited by a point source, at the second frequency, at the center of a 2D thin wall structure with a meta-barrier having a plurality of super-cells shown in FIG. 3C attached to an edge of the 2D thin wall structure.

Referring to FIGS. 4A-4C and 5A-5C, the results or effect of varying the spacing distance $w_a$ between meta-elements 100 are/is shown. Particularly, a numerical simulation model built in COMSOL Multiphysics was used to simulate wave fields created by a point source at the middle of a 2D thin wall structure with the meta-barrier 105 formed from an array of the super-cells 120 attached or bonded to one edge of the 2D thin wall structure (attached to upper (+x direction) edge and shown as a dotted line box in the figures). The remaining three boundaries (edges), i.e., the lower edge and the two side edges, of the simulated 2D thin wall structure were surrounded with perfectly matched layers (PMLs). FIGS. 4A-4C illustrate the wave fields at a 1000 Hz frequency and FIGS. 5A-5C illustrate the wave fields at a 1500 Hz frequency.

Still referring to FIGS. 4A-4C and 5A-5C, when the spacing distance $w_a$ is small, i.e., 5 mm, the wave fields keep well-circular shapes for both the 1000 Hz and 1500 Hz frequencies. However, as the spacing distance $w_a$ increases, the wave fields gradually show a small amount of diffracted waves, and these diffracted waves get slightly stronger when the waves propagate to longer distances at large incident angles.

Figure 6A:
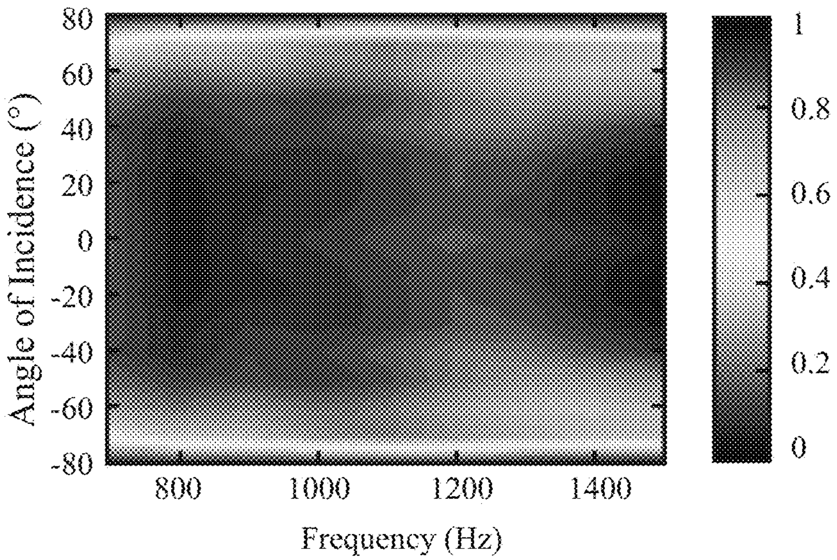
FIG. 6A illustrates a contour plot of absorption coefficients at angles of incidence between +800 and −80° and flexural wave frequencies between 700 Hz and 1500 Hz for the meta-element in FIG. 3A.
Figure 6B:
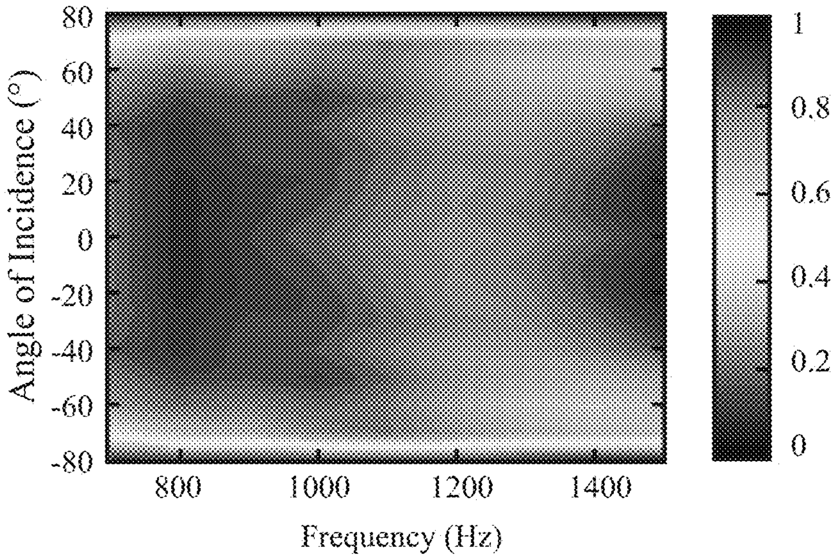
FIG. 6B illustrates a contour plot of absorption coefficients at angles of incidence between +80° and −80° and flexural wave frequencies between 700 Hz and 1500 Hz for the meta-element in FIG. 3B.
Figure 6C:
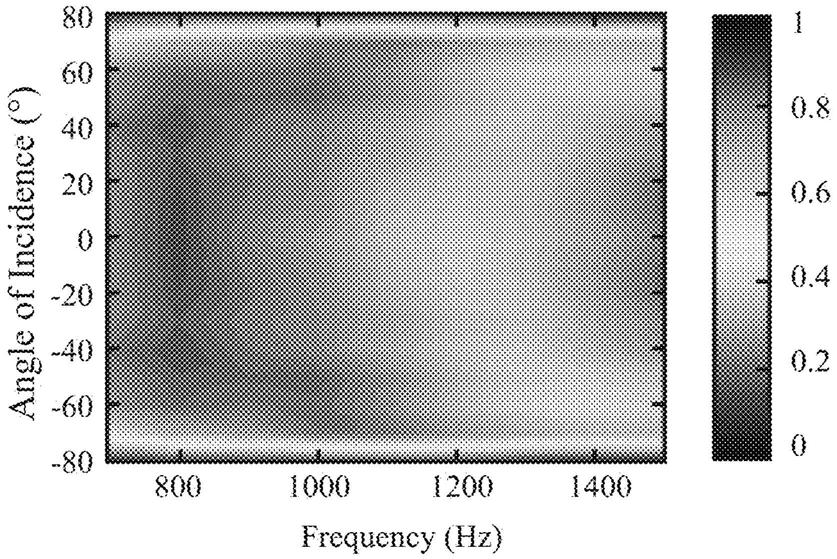
FIG. 6C illustrates a contour plot of absorption coefficients at angles of incidence between +80° and −80° and flexural wave frequencies between 700 Hz and 1500 Hz for the meta-element in FIG. 3C.

To further quantitatively study the absorption performance on the angle of incidence in the 1000 Hz-1500 Hz frequency range, absorption coefficients were numerically calculated as functions of angle of incidence and frequency. Particularly, FIGS. 6A-6C show contour plots for the absorption coefficient as a function of angle of incidence for the three spacing distances illustrated in FIGS. 3A-3C. And as observed from FIGS. 6A-6C, the meta-barrier 105 performs well at large incident angles (>70°) over a broad frequency range (700-1500 Hz). Also, as the distance spacing $w_a$ increases to 20 mm, i.e., 4 times greater than 5 mm, high absorption performance is still observed at large incident angles at lower frequency ranges.

Figure 7A:
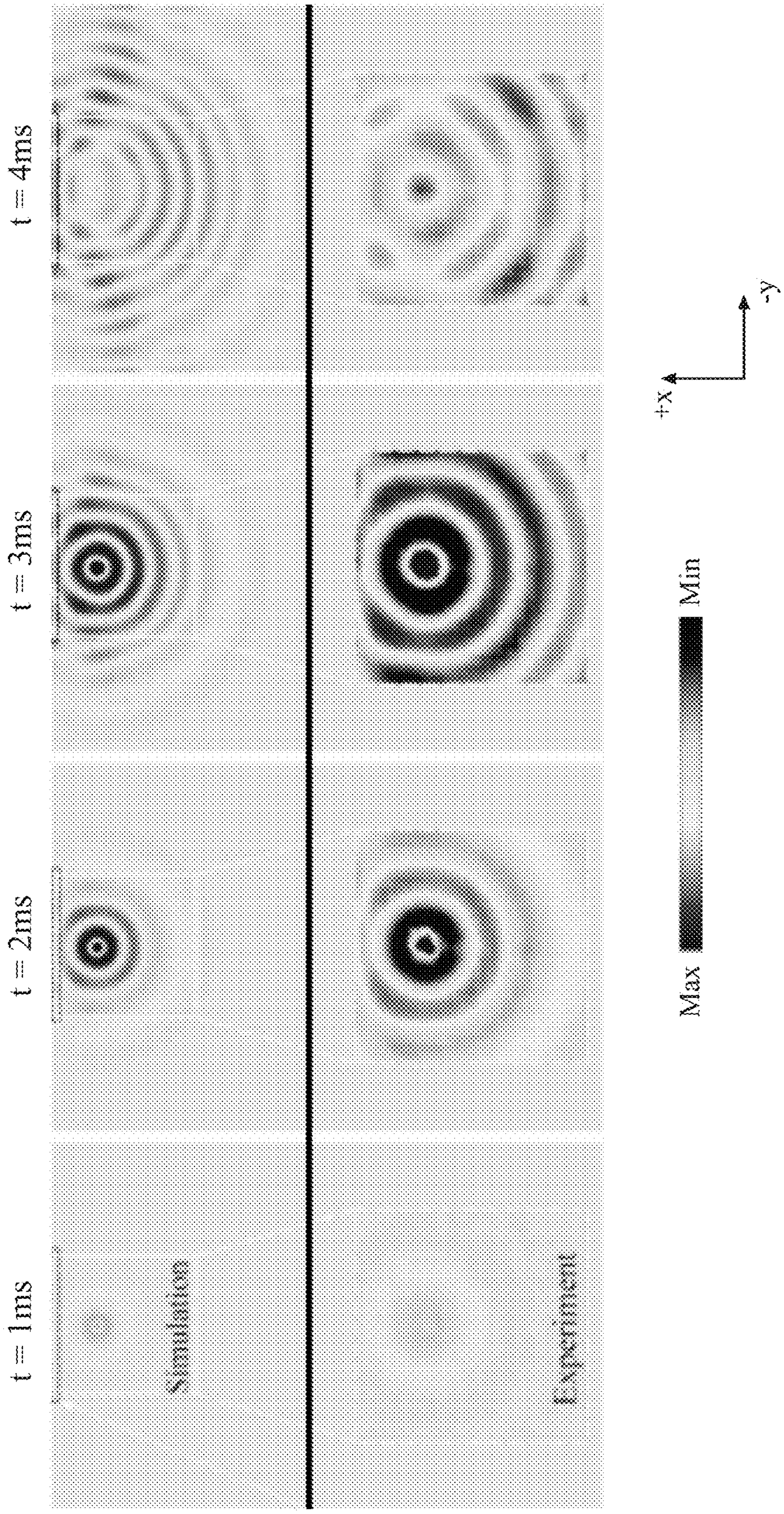
FIG. 7A illustrates numerically simulated and experimentally measured wave fields at different times (1 ms, 2 ms, 3 ms, 4 ms) for a 2D thin wall structure with a meta-barrier having super-cells according to FIG. 3A attached to an edge of the 2D thin wall structure.
Figure 7B:
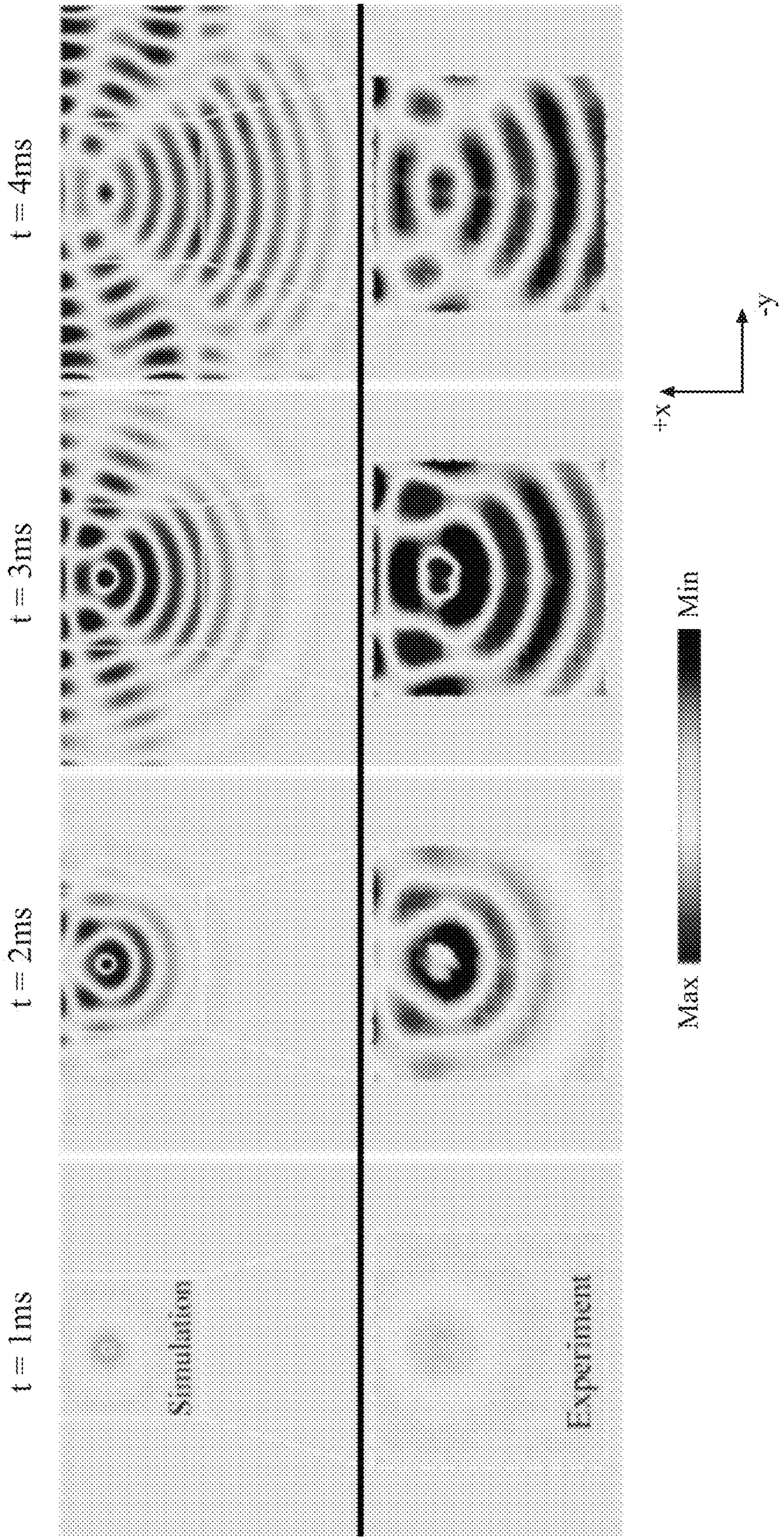
FIG. 7B illustrates numerically simulated and experimentally measured wave fields at different times (1 ms, 2 ms, 3 ms, 4 ms) for a 2D thin wall structure without a meta-barrier.

To validate the actual design of the meta-barrier 105, a rectangular shaped 2d thin wall structure (also referred to herein as a "thin wall panel") with a meta-barrier 105 attached to an edge thereof and another thin wall panel without a meta-barrier 105, were fabricated and experimentally tested (FIGS. 7A-7B). A broadband tone-burst source in the form of a piezoelectric actuator bonded to the thin wall panel at a distance of 150 mm from the edge where the meta-barrier 105 was attached was used to generate incident flexural waves. The meta-barrier 105 had an array of thirty-five (35) super-cells 120 with a distance spacing $w_a$ equal to 5 mm between individual meta-elements 100.

Referring to FIG. 7A, simulated and experimentally measured wave fields in the thin wall panel with the meta-barrier 105 attached to an edge thereof are shown. In the images shown in FIG. 7A, the meta-barrier 105 was attached to the upper (+x direction) edge of the thin wall panel and the wave fields were measured at times of 1 millisecond (ms), 2 ms, 3 ms, and 4 ms after initiation of the piezoelectric actuator.

And as observed in FIG. 7A, the experimental results (bottom row, −x direction) matched well with the numerical simulations (top row, +x direction) with high absorption performance on the upper edge observed for the meta-barrier 105. In contrast, FIG. 7B shows the results for the same test for a thin wall panel without the meta-barrier 105 in which incident waves are reflected at the top free edge and thereby result in a diffracted wave field.

Figure 8A:
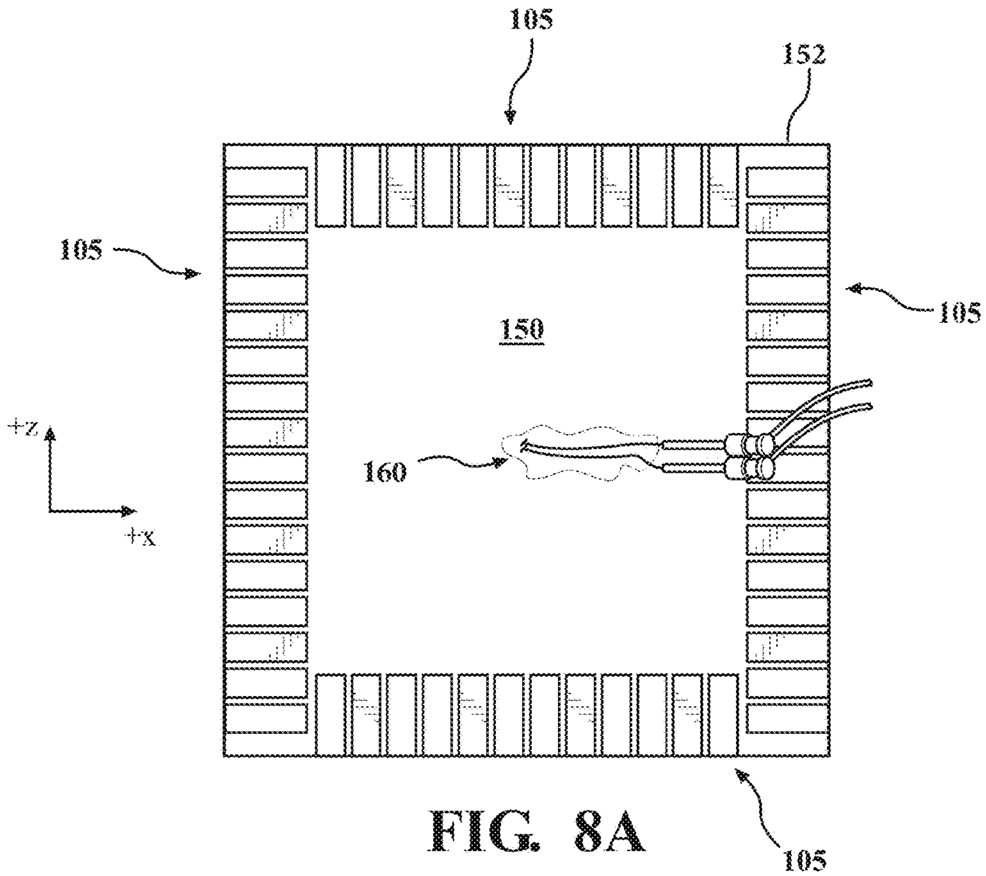
FIG. 8A illustrates a fabricated 2D thin wall structure with a meta-barrier having super-cells according to FIG. 3A attached to four edges of the 2D thin wall structure and a piezoelectric actuator attached to the center of the 2D thin wall structure.

To further illustrate the robustness of the designed meta-barrier 105, a 300 mm×300 mm thin wall panel 150 with a meta-barrier 105 attached to all four edges 152 thereof (see FIG. 8A), and a 300 mm×300 mm thin wall panel without any meta-barriers 105 (not shown), were fabricated and evaluated. Particularly, a piezoelectric actuator 160 was bonded at the center of both thin wall panels to generate incident flexural waves at different frequencies, and amplitude and phase profiles of the wave fields on both thin wall panels were experimentally measured and compared with numerical results.

Figure 8B:
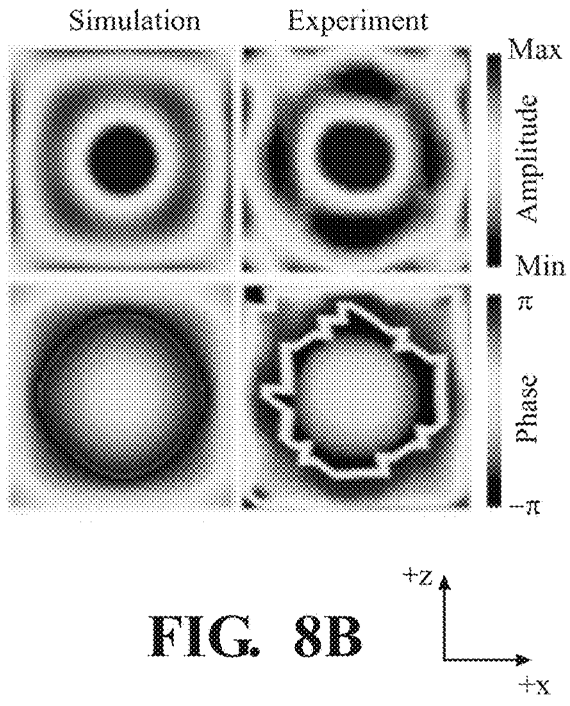
FIG. 8B illustrates numerically simulated and experimentally measured wave fields of the fabricated 2D thin wall structure with the meta-barriers in FIG. 8A excited by the piezoelectric actuator at a first frequency.
Figure 8C:
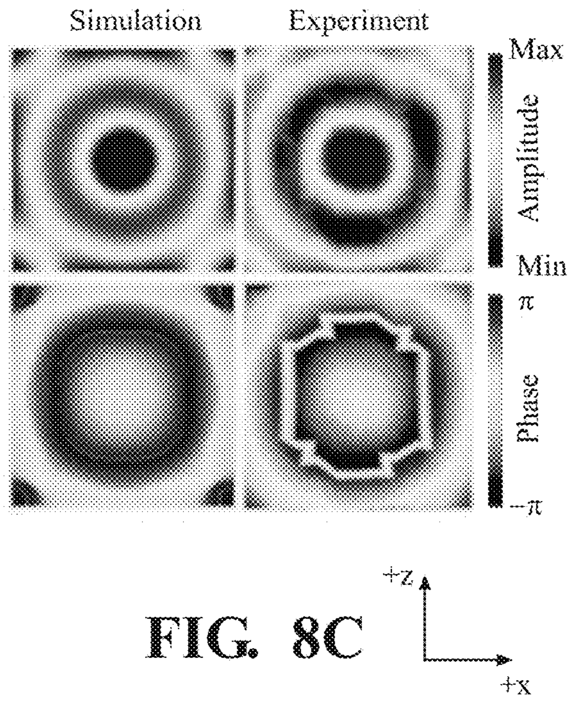
FIG. 8C illustrates numerically simulated and experimentally measured wave fields of the 2D thin wall structure with the meta-barriers in FIG. 8A excited by the piezoelectric actuator at a second frequency.
Figure 8D:
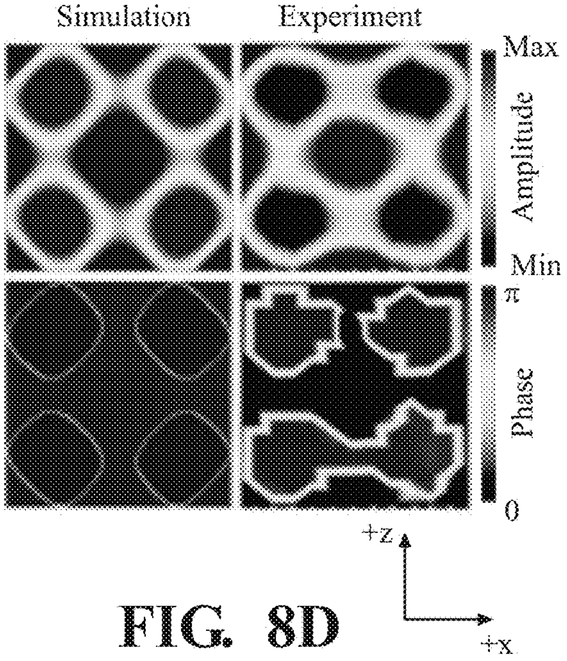
FIG. 8D illustrates numerically simulated and experimentally measured wave fields of the 2D thin wall structure in FIG. 8A, without meta-barriers, excited by the piezoelectric actuator at the first frequency.
Figure 8E:
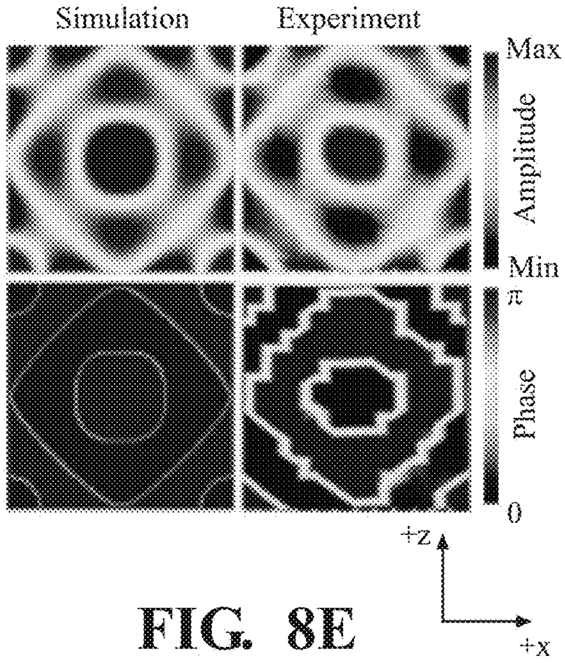
FIG. 8E illustrates numerically simulated and experimentally measured wave fields of the 2D thin wall structure in FIG. 8A, without meta-barriers, excited by the piezoelectric actuator at the second frequency.
Figure 8F:
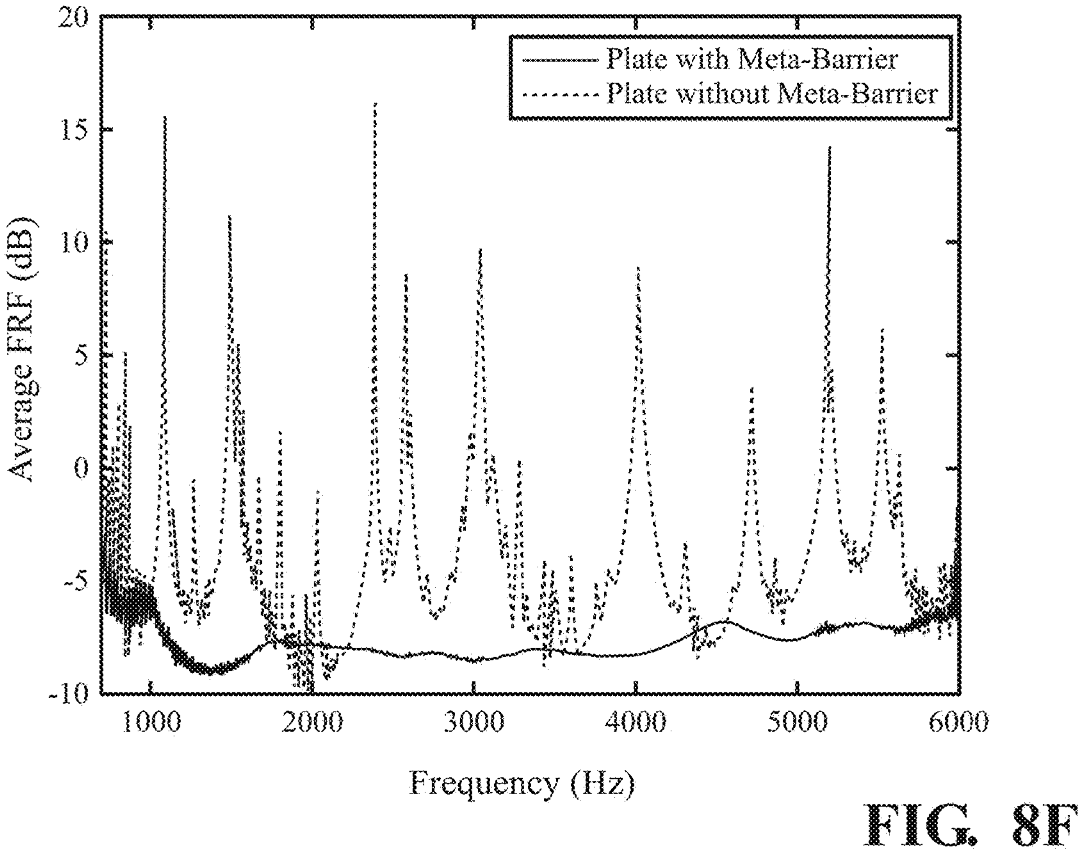
FIG. 8F is a graphical plot of average frequency response function (FRF) as a function of frequency for the 2D thin wall structure in FIG. 8A with meta-barriers and the 2D thin wall structure in FIG. 8A without meta-barriers.

Referring to FIGS. 8B-8C, the thin wall panel with the meta-barriers 105 functioned as an energy sink or black hole, the incoming waves generated in the center of the plate were totally absorbed on the edges, and a propagating wave field resulted. The phase profiles follow a linear change, indicating a constant propagation. However, and with reference to FIGS. 8D-8E, the thin wall panel without the meta-barriers 105 exhibited large vibration amplitudes at its resonant frequencies due to the reflections on or at the boundaries (edges). And with reference to FIG. 8F, the vibration attenuation ability of the meta-barriers 105 was evaluated by measuring the averaged Frequency Response Function (FRF) from 500 Hz to 6000 Hz for the two different 300 mm×300 mm thin wall panels. As observed from FIG. 8F, the averaged FRF is greatly reduced over a broad frequency range by introducing or using the meta-barriers 105.

In view of the above simulated and experimental results for the meta-element 100 and meta-barrier 105, it was determined that meta-elements and meta-barriers according to the teachings of the present disclosure exhibit an average absorption coefficient of greater than or equal to 95% for broadband flexural waves. In some variations, the meta-elements and meta-barriers according to the teachings of the present disclosure exhibit an average absorption coefficient of greater than or equal to 95% for flexural waves in the audible frequency range. And in at least one variation, the meta-elements and meta-barriers according to the teachings of the present disclosure exhibit an average absorption coefficient of greater than or equal to 99%, e.g., greater than 99.5%, for flexural waves in the audible frequency range.

Figure 9:
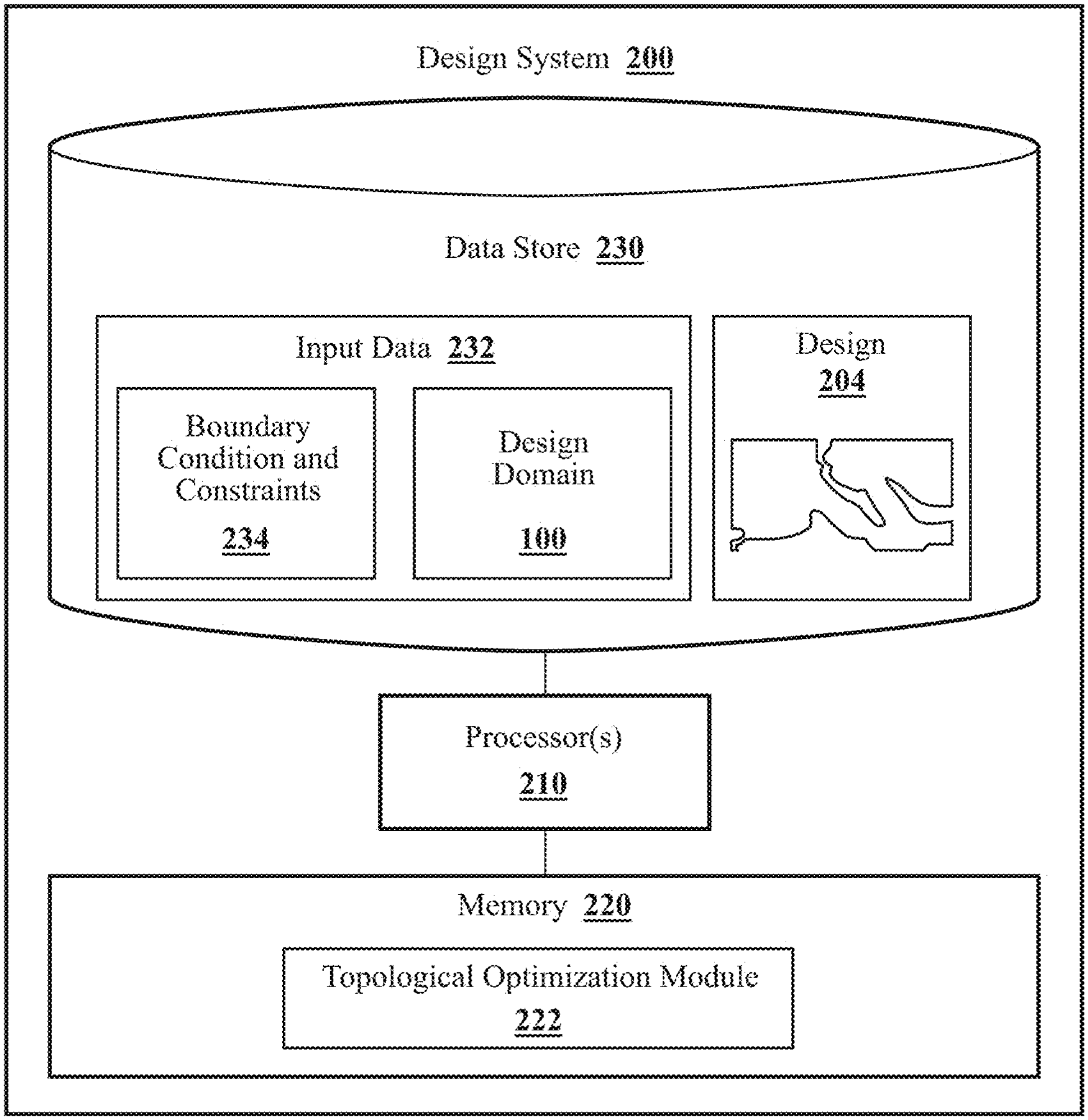
FIG. 9 is a block diagram for a system for designing metal-elements and meta-barriers according to the teachings of the present disclosure.

Referring now to FIG. 9, a block diagram for a design system 200 for designing meta-elements and/or meta-barriers according to the teachings of the present disclosure is shown. The design system 200 includes one or more processor(s) 210. Accordingly, the processor(s) 210 may be a part of the design system 200 or the design system 200 may access the processor(s) 210 through a data bus or another communication path. In one or more variations, the processor(s) 210 is an application-specific integrated circuit that is configured to implement functions associated with a topological optimization module 222. In general, the processor(s) 210 is an electronic processor, such as a microprocessor, which is capable of performing various functions as described herein.

In some variations, the design system 200 includes a memory 220 that stores the topological optimization module 222. The memory 220 may be a random-access memory (RAM), read-only memory (ROM), a hard disk drive, a flash memory, or other suitable memory for storing the topological optimization module 222. The topological optimization module 222 is, for example, computer-readable instructions that, when executed by the processor(s) 210, cause the processor(s) 210 to perform the various functions disclosed herein.

Furthermore, in some variations, the design system 200 includes a data store 230. The data store 230 is, in some variations, an electronic data structure such as a database that is stored in the memory 220 or another memory and that is configured with routines that can be executed by the processor(s) 210 for analyzing stored data, providing stored data, organizing stored data, generating stored data and so on. Thus, in at least one variation the data store 230 stores data used by the topological optimization module 222 in executing various functions.

In one example, the data store 230 may store input data 232 that the topological optimization process may use to create the meta-element 100 and/or meta-barrier 105, which may also be stored in the data store 230 after it is created. The input data 232 can include any data necessary for performing the topological optimization process so as to create a design 204 for the meta-element 100 and/or meta-barrier 105. As such, the input data 232 may include boundary conditions and constraints 234 material properties and structure dimensions, which the topological optimization process must consider when creating the design 204. The boundary conditions and constraints 234 can include a frequency range and an absorption coefficient of the waves to be absorbed by the meta-element 100 and/or meta-barrier 105. In some variations, the data store 230 stores algorithms and/or expressions the topological optimization process may use to create the meta-element 100 and/or meta-barrier 105. For example, the data store 230 may store one or more of Eqn. 13, the expressions for $R_i$ and $R_n$ in Table 1, and the expression for B2 and $B_4$ in Table 2.

In addition, the input data 232 can include the design domain for the meta-element 100, which may provide the design space that the design 204 for the meta-element 100 and/or meta-barrier 105 is designed within. Generally, the design domain for the meta-element 100 is inversely proportional to the frequencies of the vibrations to be absorbed for a given material in the meta-element 100 and/or varied based on the different densities of the material used to create the meta-element 100 and/or meta-barrier 105. As such, designs of absorbers that are meant to absorb lower frequency vibrations generally require a larger meta-element 100 than higher frequency absorption.

As mentioned before, the topological optimization module 222 includes instructions that cause the processor(s) 210 to perform any of the functions described herein. Accordingly, the topological optimization module generally includes instructions that function to control the processor(s) 210 to utilize the input data 232 and a topological optimization process to design a shape/structure of the meta-element 100 and/or meta-barrier 105 within the design domain thereof to maximize absorption performance of the absorber.

As noted above, the topological optimization process is a mathematical method that optimizes material layout within the design domain for a given set of boundary conditions and constraints with the goal of maximizing the performance of the system, in this case, absorption of vibrations acting upon a particular structure. The topological optimization process performed by the processor(s) 210 may use a finite element method (FEM) to evaluate the design performance. The design is optimized using either gradient-based mathematical programming techniques, such as the optimality criteria algorithm and the method of moving asymptotes, or non-gradient-based algorithms, such as genetic algorithms. In addition, the optimization objective of the topological optimization process may be described per Eqn. 14.

The design 204 of the meta-element 100 and/or meta-barrier 105 can be any type of data structure that electronically describes the meta-element 100 and/or meta-barrier 105. For example, the design 204 can be stored in the form of a 3D file format, such as OBJ, FBX, STL, AMF, IGES, and more. However, it should be understood that any type of methodology for storing the design 204 can be utilized.

Once the design 204 of the meta-element 100 and/or meta-barrier 105 has been determined using the topological optimization process described above, the meta-element 100 and/or meta-barrier 105 may be fabricated per the design 204. In one example, the topological optimization module 222 includes instructions that cause the processor(s) 210 to provide the design 204 to a fabrication device, such as a 3D printer (not shown). The 3D printer will then essentially print a meta-element 100 and/or meta-barrier 105 that generally mimics the design 204. Of course, it should be understood that other types of methodologies for manufacturing the design can be utilized as well. For example, more traditional forms of computer-aided manufacturing, such as the use of software to control machine tools in the manufacturing of the meta-element 100 and/or meta-barrier 105, can also be utilized. Further still, the design 204 could be converted into a set of human-readable design prints that allow a human to manufacture the meta-element 100 and/or meta-barrier 105 using appropriate tools and materials.

Figure 10A:
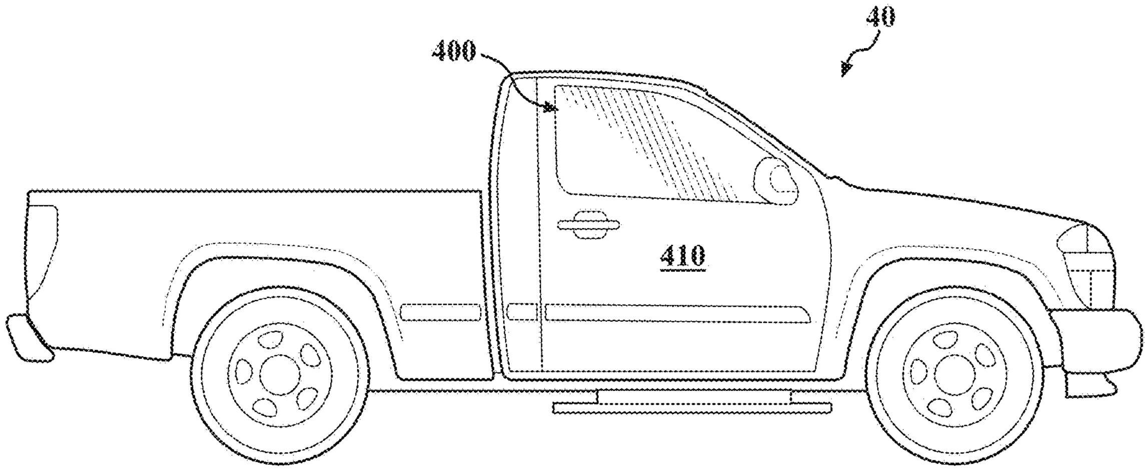
FIG. 10A illustrates a motor vehicle with 2D thin wall structures with meta-barriers according to the teachings of the present disclosure.

Referring now to FIGS. 10A-10E, non-limiting examples of 2D thin wall structures with meta-barriers according to the teachings of the present disclosure are shown. For example, FIG. 10A illustrates a motor vehicle with a glass window 400 that has at least one meta-barrier (not shown) on an edge thereof and a door panel 410 that has at least one meta-barrier (not shown) on an edge thereof. However, it should be understood that other 2D thin wall structures of the vehicle 40, e.g., panels in the interior of the vehicle, panels in the engine compartment area of the vehicle, panels of a trunk space of the vehicle, panels of a truck bed, a sunroof panel, among others, can include one or more meta-barriers according to the teachings of the present disclosure attached at or near an edge thereof.

Figure 10B:
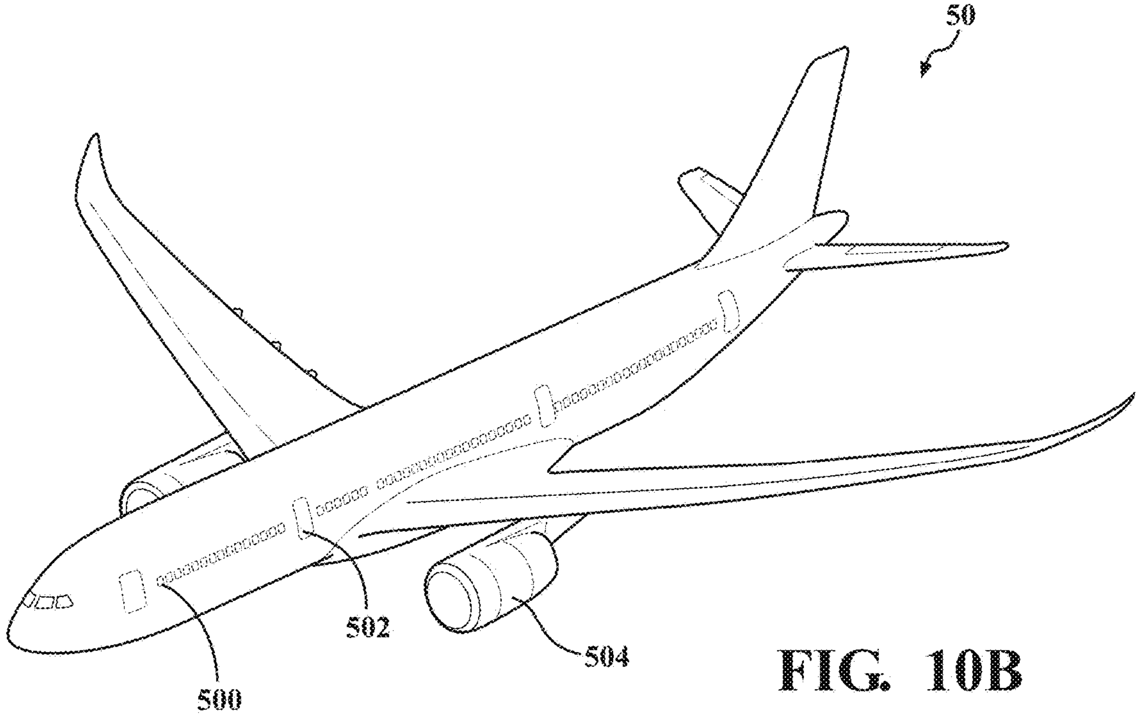
FIG. 10B illustrates an aircraft with 2D thin wall structures with meta-barriers according to the teachings of the present disclosure.

FIG. 10B illustrates an aircraft 50 with a glass window 500, door panel 502 and engine panel 504 that may or may not include at least one meta-barrier (not shown) attached at or near an edge thereof. However, it should be understood that other 2D thin wall structures of an aircraft, e.g., instrument panels, wall panels, floor panels, other door panels, among others, can include one or more meta-barriers according to the teachings of the present disclosure attached at or near an edge thereof.

FIG. 10C illustrates a household or industrial appliance 60 with a door panel 600 and a side panel 602 that may or may not include at least one meta-barrier (not shown) attached at or near an edge thereof. However, it should be understood that other 2D thin wall structures of an appliance, e.g., an instrument panel, an interior panel, among others, can include one or more meta-barriers according to the teachings of the present disclosure attached at or near an edge thereof.

FIG. 10D illustrates a work environment 70, e.g., a data storage center, with panels 700, 702 that may or may not include at least one meta-barrier (not shown) attached at or near an edge thereof. However, it should be understood that other 2D thin wall structures of such a work environment, e.g., a ceiling panel, a floor panel, a door panel, a glass window, among others, can include one or more meta-barriers according to the teachings of the present disclosure attached at or near an edge thereof.

Figure 10E:
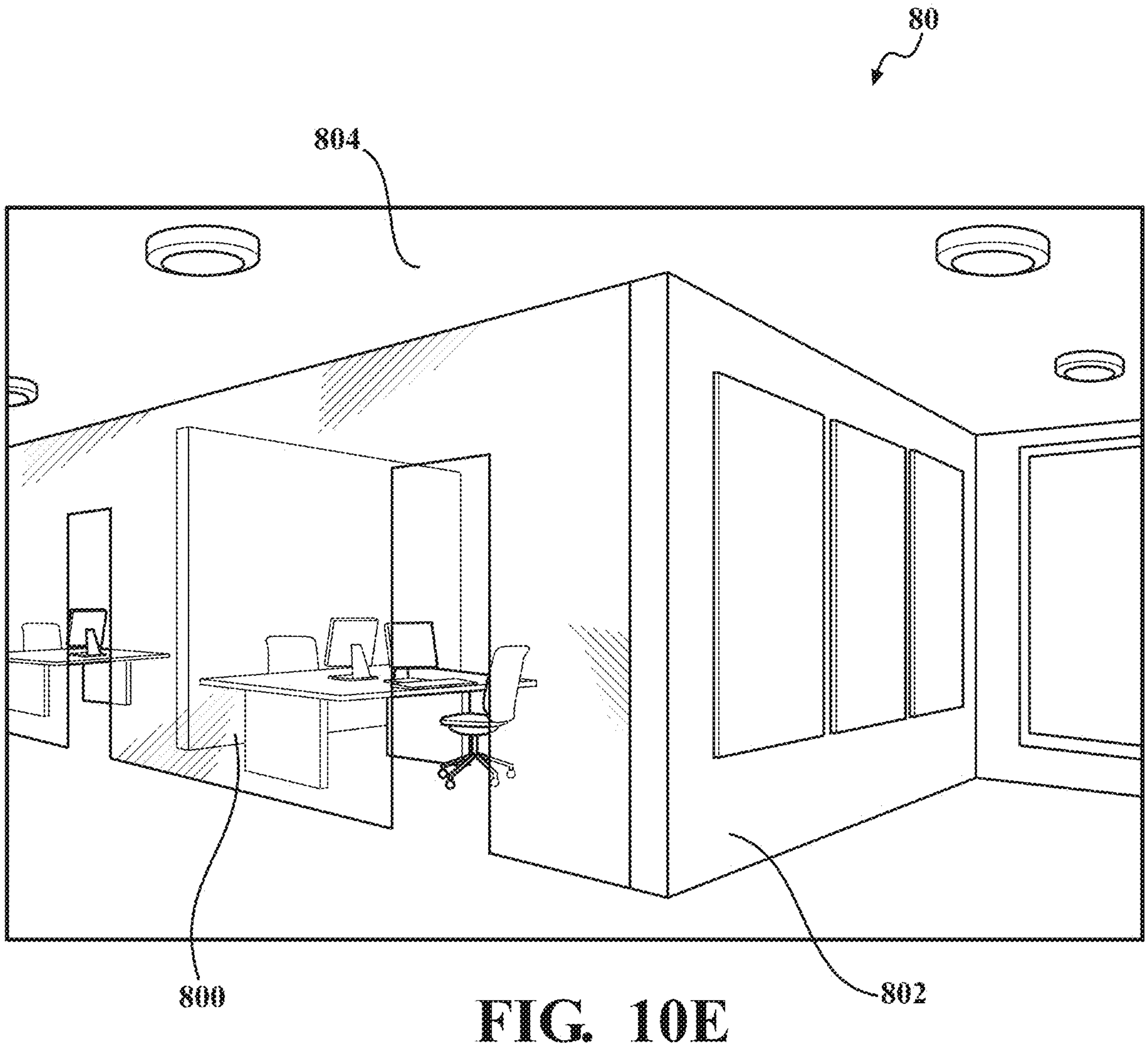
FIG. 10E illustrates another work environment with 2D thin wall structures with meta-barriers according to the teachings of the present disclosure.

FIG. 10E illustrates a work environment 80, e.g., an office space, with window wall panels 800, wall panels 802, and roof panels 804 that may or may not include at least one meta-barrier (not shown) attached at or near an edge thereof. However, it should be understood that other 2D thin wall structures of such a work environment, e.g., a floor panel, a door panel, a glass window, among others, can include one or more meta-barriers according to the teachings of the present disclosure attached at or near an edge thereof.

It should be understood from the teachings of the present disclosure that methods and systems for designing and fabricating broadband perfect absorbers for flexural wave absorption via topological optimization are provided. A physical model is established, and the condition for realized perfect absorption is theoretically derived. The absorption performance is experimentally characterized, and a maximum absorption of more than 95% is achieved over a broad frequency range from 700 Hz to over 4000 Hz.

Moreover, design of a broadband-perfect-absorbing meta-barrier for flexural wave absorption of or on 2D thin wall structures via topological optimization is provided. The main feature of the proposed meta-barrier is a vibration and noise reduction meta-barrier for 2D panels over broad frequency range with large incident angles. In addition, the meta-barriers only cover a small portion of the 2D-panel surface in contrast to traditional damping materials that cover the majority of a 2D-panel surface. The size of the meta-barrier could be further reduced by introducing more advanced 3D printing techniques and more sophisticated topological optimization methods.

The current design is based on a free boundary on a beam or plate, but the idea theoretically can be expected for other types of boundary conditions, such as fixed boundary or simply-supported boundary conditions.

The flowcharts and block diagrams in the figures illustrate the architecture, functionality, and operation of possible implementations of systems, methods, and computer program products according to various forms or variations. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any processing system or another apparatus adapted for conducting the methods described herein is suited. A typical combination of hardware and software can be a processing system with computer-usable program code that, when being loaded and executed, controls the processing system such that it conducts the methods described herein. The systems, components, and/or processes also can be embedded in a computer-readable storage, such as a computer program product or other data programs storage device, readable by a machine, tangibly embodying a program of instructions executable by the machine to perform methods and processes described herein. These elements can also be embedded in an application product that comprises all the features enabling the implementation of the methods described herein and which, when loaded in a processing system, is able to conduct these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, module as used herein includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for conducting operations for aspects of the present arrangements may be written in any combination of one or more programming languages, including an object-oriented programming language such as Java™ Smalltalk, C++, or the like, and conventional procedural programming languages, such as the "C" programming language or similar programming languages. The program code may execute entirely on the user's computer, partly on the user's computer, partly on a stand-alone software package, partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC, or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A vibration and noise absorber comprising:

a thin wall structure with an arbitrary boundary condition; and a plurality of meta-elements attached at an edge of the thin wall structure, the plurality of meta-elements each comprising a topology optimized shape that is a function of an objective function that minimizes a reflection coefficient of flexural waves in an audible frequency range propagating towards and impinging the plurality of meta-elements.

2. The vibration and noise absorber according to claim 1, wherein the plurality of meta-elements covers less than 90% of a major surface of the thin wall structure.

3. The vibration and noise absorber according to claim 1, wherein the plurality of meta-elements covers less than 95% of a major surface of the thin wall structure.

4. The vibration and noise absorber according to claim 1, wherein the plurality of meta-elements has an average absorption coefficient greater than 99.9% for flexural waves in the audible frequency range propagating along the thin wall structure and impinging the plurality of meta-elements.

5. The vibration and noise absorber according to claim 1, wherein the thin wall structure is a beam.

6. The vibration and noise absorber according to claim 1, wherein the thin wall structure is a two-dimensional (2D) panel.

7. The vibration and noise absorber according to claim 6, wherein the plurality of meta-elements is a plurality of spaced apart meta-elements forming a meta-barrier attached to the edge of the 2D panel.

8. The vibration and noise absorber according to claim 7, wherein the meta-barrier covers less than 95% of a major surface of the 2D panel.

9. The vibration and noise absorber according to claim 7, wherein the meta-barrier has an average absorption coefficient greater than 99% for flexural waves in the audible frequency range propagating along the 2D panel and impinging the meta-barrier.

10. The vibration and noise absorber according to claim 7, wherein the meta-barrier has an average absorption coefficient greater than 99.5% for flexural waves in the audible frequency range propagating along the 2D panel and impinging the meta-barrier.

11. A vibration and noise absorber comprising:

a thin wall structure with at least one edge with an arbitrary boundary condition; and a meta-barrier comprising a plurality of meta-elements attached at the at least one edge, the meta-barrier comprising a topology optimized shape that is a function of an objective function that minimizes a reflection coefficient of flexural waves in an audible frequency range propagating towards and impinging the meta-barrier.

12. The vibration and noise absorber according to claim 11, wherein the meta-barrier covers less than 90% of a major surface of the thin wall structure.

13. The vibration and noise absorber according to claim 11, wherein the meta-barrier covers less than 95% of a major surface of the thin wall structure.

14. The vibration and noise absorber according to claim 11, wherein the meta-barrier has an average absorption coefficient greater than 99% for flexural waves in the audible frequency range propagating along the thin wall structure and impinging the meta-barrier.

15. The vibration and noise absorber according to claim 11, wherein the thin wall structure is a two-dimensional (2D) panel.

16. The vibration and noise absorber according to claim 15, wherein the meta-barrier is a plurality of spaced apart meta-elements attached to the at least one edge of the 2D panel.

17. The vibration and noise absorber according to claim 16, wherein the meta-barrier has an average absorption coefficient greater than 99.5% for flexural waves in the audible frequency range propagating along the 2D panel and impinging the meta-barrier.

18. A vibration and noise absorber comprising:

a thin wall 2D panel with at least one edge with an arbitrary boundary condition; and a meta-barrier comprising a plurality of meta-elements attached at the at least one edge, the meta-barrier comprising a topology optimized shape that is a function of an objective function that minimizes a reflection coefficient of flexural waves in an audible frequency range propagating towards and impinging the meta-barrier, the meta-barrier having an average absorption coefficient greater than 99.5% for flexural waves in the audible frequency range propagating along the 2D panel and impinging the meta-barrier.

19. The vibration and noise absorber according to claim 18, wherein the meta-barrier covers less than 90% of a major surface of the thin wall 2D panel.

20. The vibration and noise absorber according to claim 18, wherein the meta-barrier covers less than 95% of a major surface of the thin wall 2D panel.

* * * * *